(12) United States Patent
Liu et al.

(10) Patent No.: US 10,038,175 B2
(45) Date of Patent: Jul. 31, 2018

(54) BUS BAR MODULE

(71) Applicant: YAZAKI CORPORATION, Tokyo (JP)

(72) Inventors: Haifeng Liu, Kakegawa (JP); Yukihisa Kikuchi, Kakegawa (JP)

(73) Assignee: YAZAKI CORPORATION, Minato-ku (JP)

( * ) Notice: Subject to any disclaimer, the term of this patent is extended or adjusted under 35 U.S.C. 154(b) by 625 days.

(21) Appl. No.: 14/406,780

(22) PCT Filed: Jun. 12, 2013

(86) PCT No.: PCT/JP2013/003675
§ 371 (c)(1),
(2) Date: Dec. 10, 2014

(87) PCT Pub. No.: WO2013/187056
PCT Pub. Date: Dec. 19, 2013

(65) Prior Publication Data
US 2015/0171403 A1 Jun. 18, 2015

(30) Foreign Application Priority Data
Jun. 15, 2012 (JP) .................................. 2012-135568

(51) Int. Cl.
*H01M 2/02* (2006.01)
*H01M 2/20* (2006.01)

(52) U.S. Cl.
CPC .................................. *H01M 2/206* (2013.01)

(58) Field of Classification Search
None
See application file for complete search history.

(56) References Cited

U.S. PATENT DOCUMENTS

| 4,891,471 | A | 1/1990 | Ono et al. |
| 2012/0295485 | A1 | 11/2012 | Ikeda et al. |
| 2012/0306474 | A1 | 12/2012 | Ikeda et al. |

FOREIGN PATENT DOCUMENTS

| JP | 64-6719 U | 1/1989 |
| JP | 2001-57720 A | 2/2001 |

(Continued)

OTHER PUBLICATIONS

International Search Report of PCT/JP2013/003675 dated Nov. 5, 2013 [PCT/ISA/210].

(Continued)

*Primary Examiner* — Barbara L Gilliam
*Assistant Examiner* — Zhongqing Wei
(74) *Attorney, Agent, or Firm* — Sughrue Mion, PLLC

(57) ABSTRACT

A bus bar module has a body part, first to third hinge covers, first to third hinges, and first and second parts. The first to third hinge covers are directly or indirectly connected through the first to third hinge parts to the case of the body part. The first to third hinge covers and the first to third hinges are integrally formed with the case of the body part. In an initial state of the bus bar module, the case of the body part, the first to third hinge covers and the first to third hinge parts have no undercut. The first to third hinge covers are bent at the first to third hinge parts, respectively, so that at least a part of the second hinge cover covers the first part and at least a part of the third hinge cover covers the second part.

2 Claims, 23 Drawing Sheets

(56) References Cited

FOREIGN PATENT DOCUMENTS

| JP | 2011-120318 A | 6/2011 | | |
|---|---|---|---|---|
| JP | 2012-64455 A | 3/2012 | | |
| JP | 2012-64457 A | 3/2012 | | |
| JP | WO 2012036318 A1 * | 3/2012 | .......... | H01M 2/1077 |
| WO | 2012/036317 A1 | 3/2012 | | |
| WO | 2012/036318 A1 | 3/2012 | | |

OTHER PUBLICATIONS

Communication dated Mar. 1, 2016 from the Japanese Patent Office in counterpart application No. 2012-135568.

* cited by examiner

Prior Art
Fig. 3
(a)
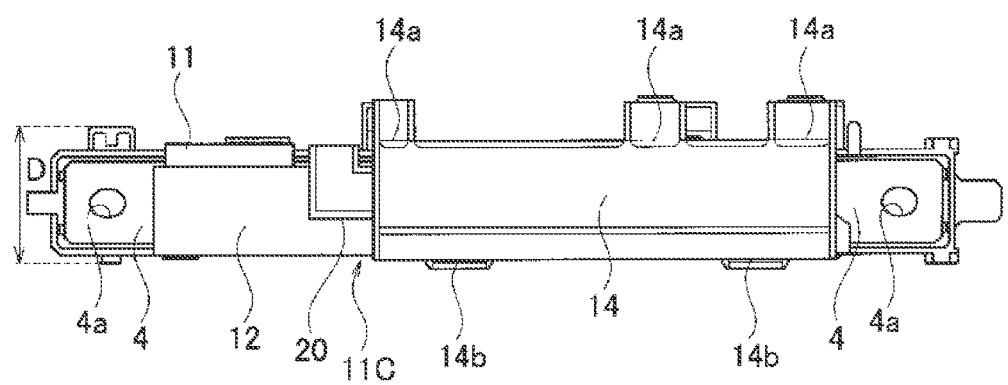
(b)
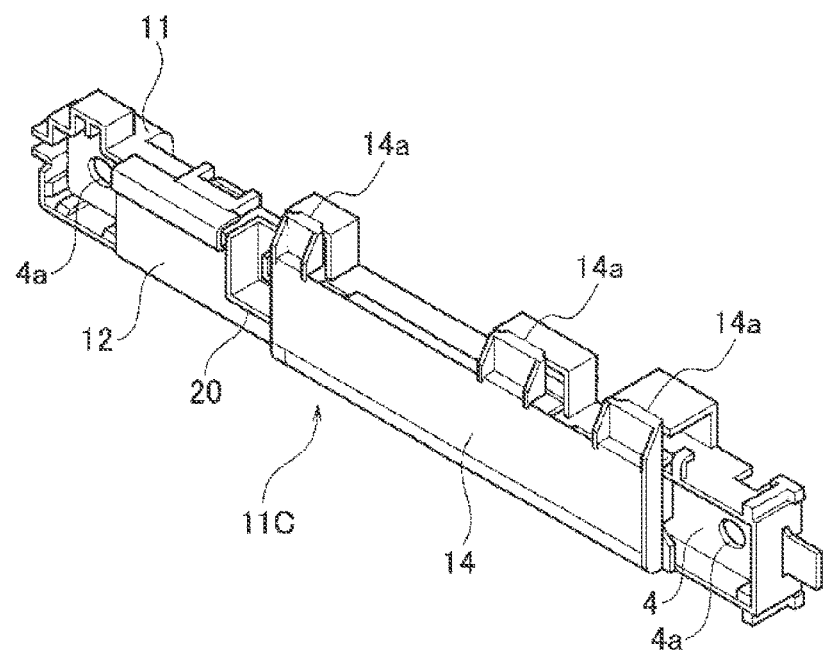

Prior Art
Fig. 5
(a)
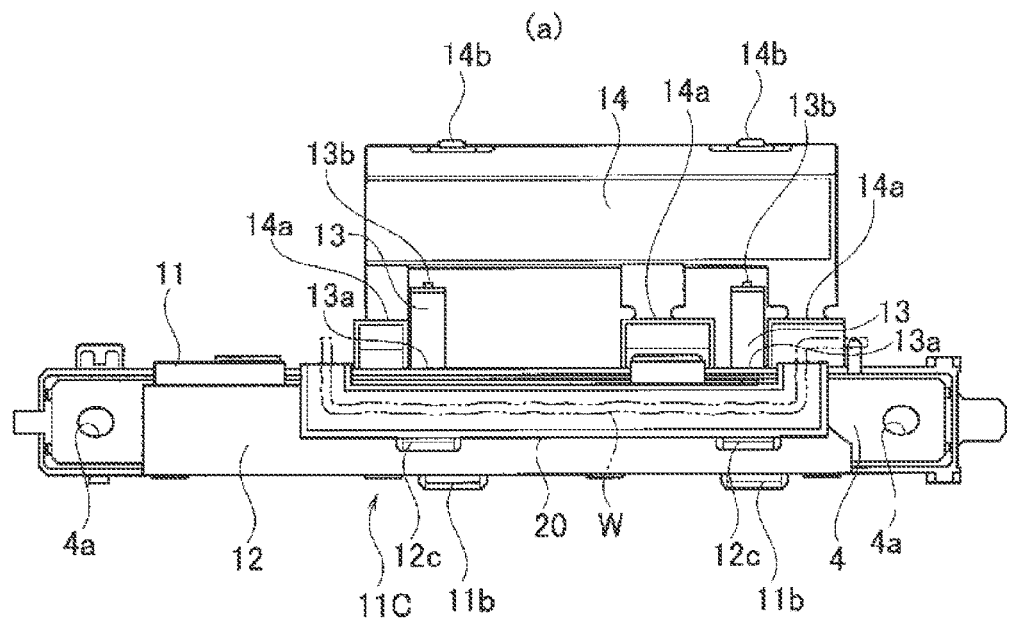
(b)
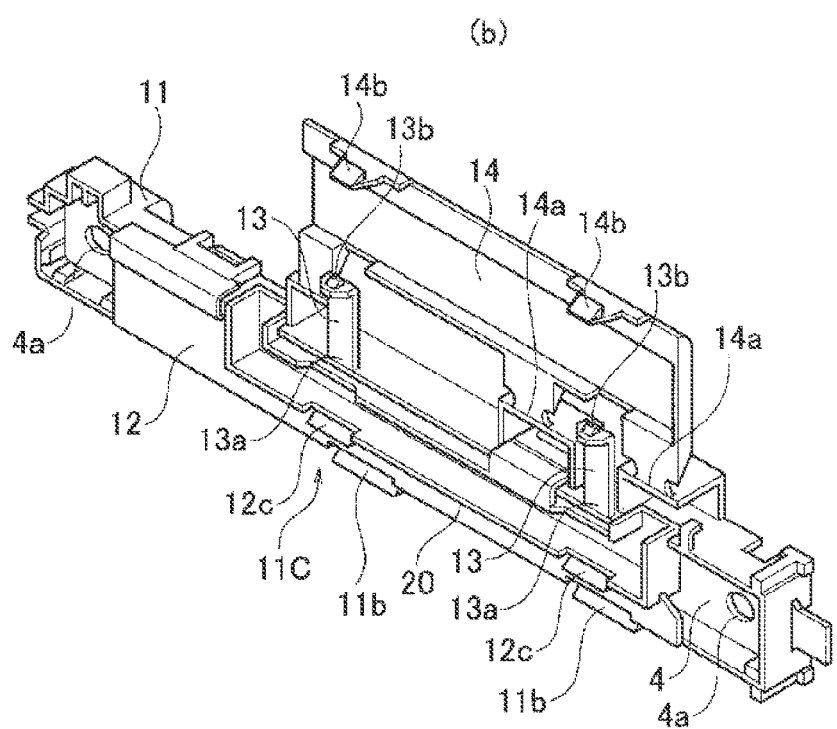

Prior Art
Fig. 6
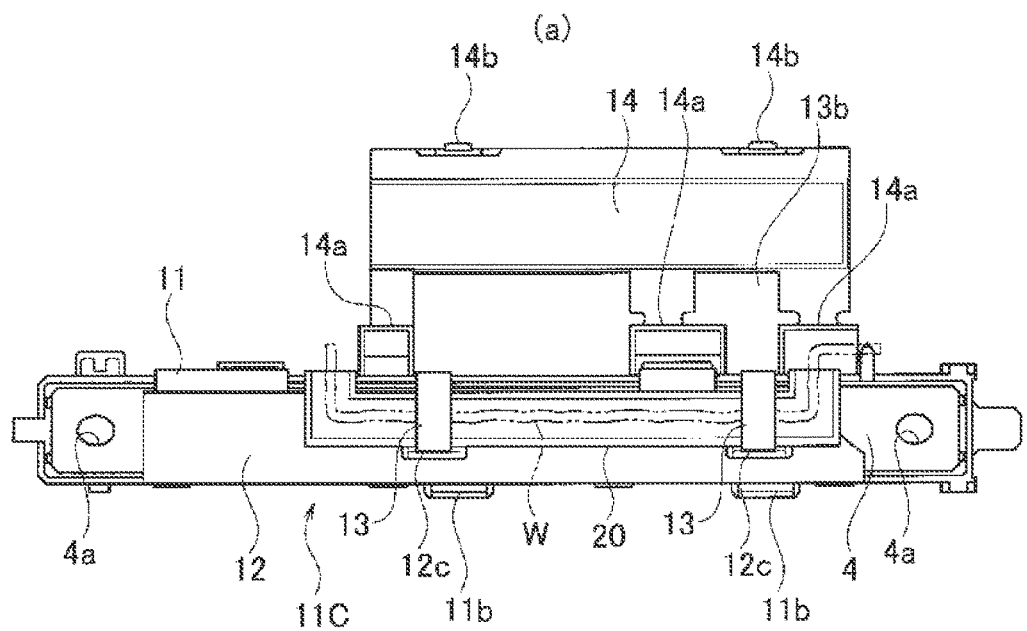
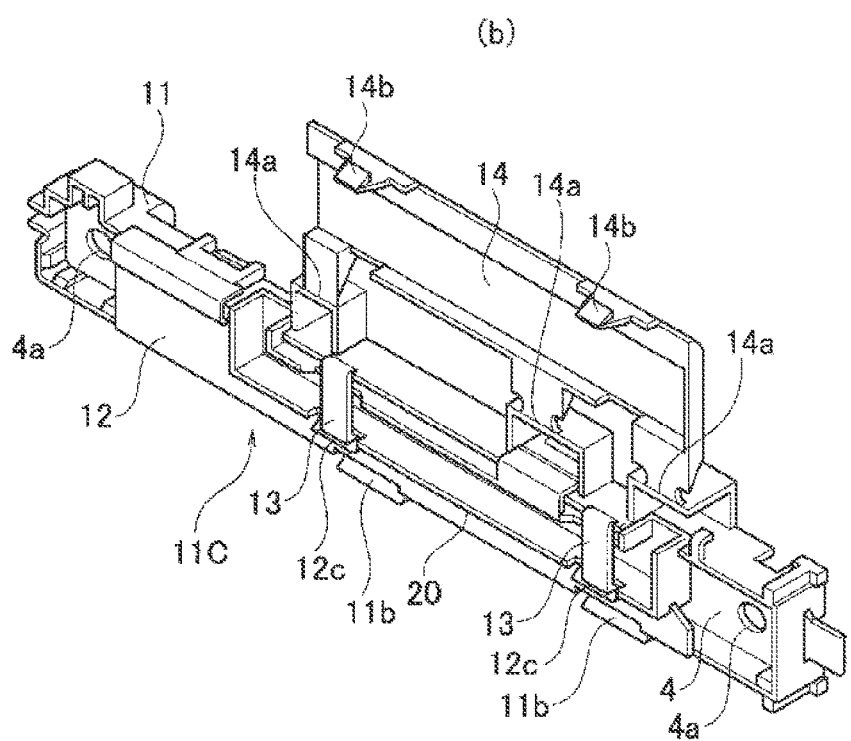

[Fig. 7]
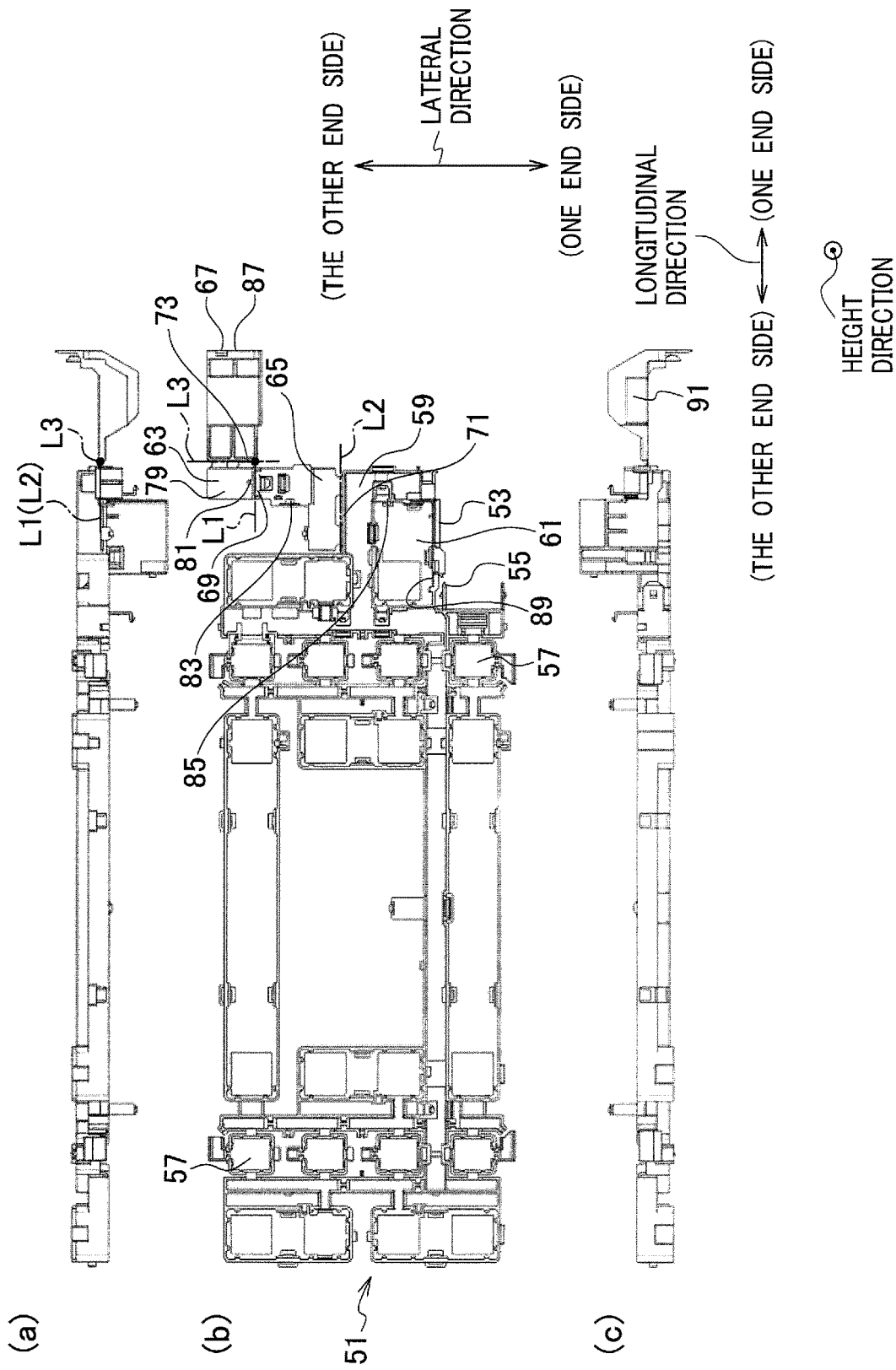

[Fig. 8]
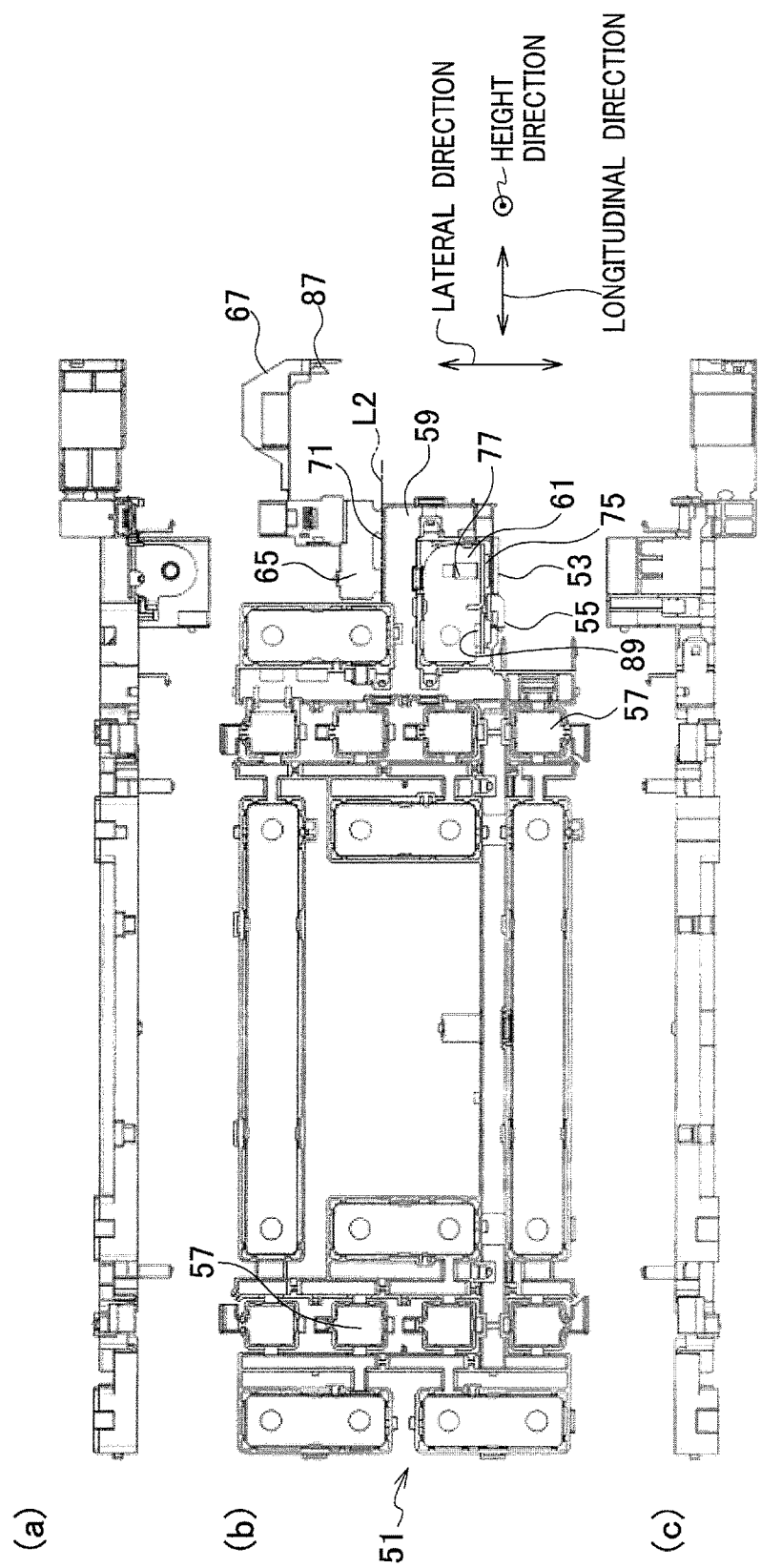

[Fig. 9]
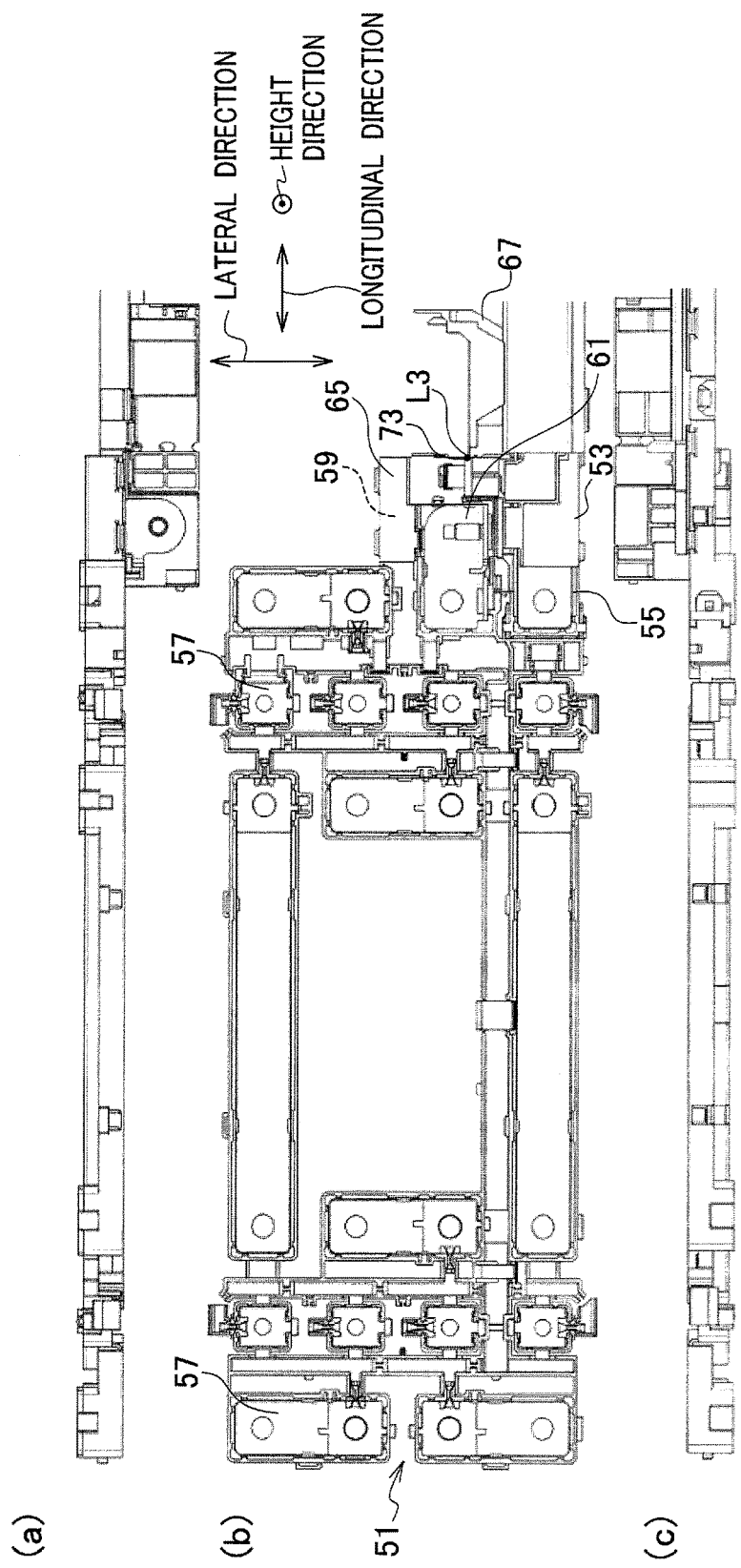

[Fig. 10]
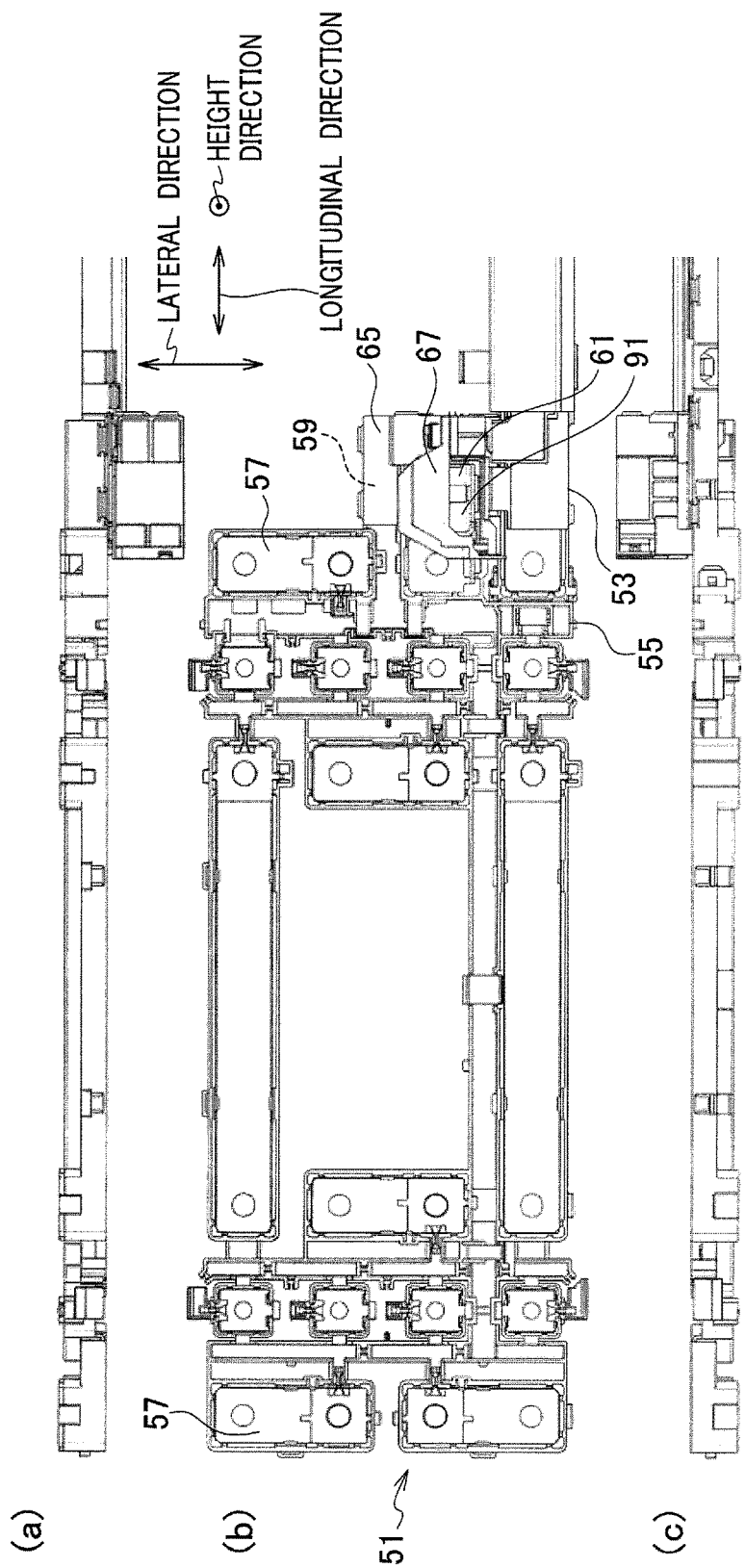

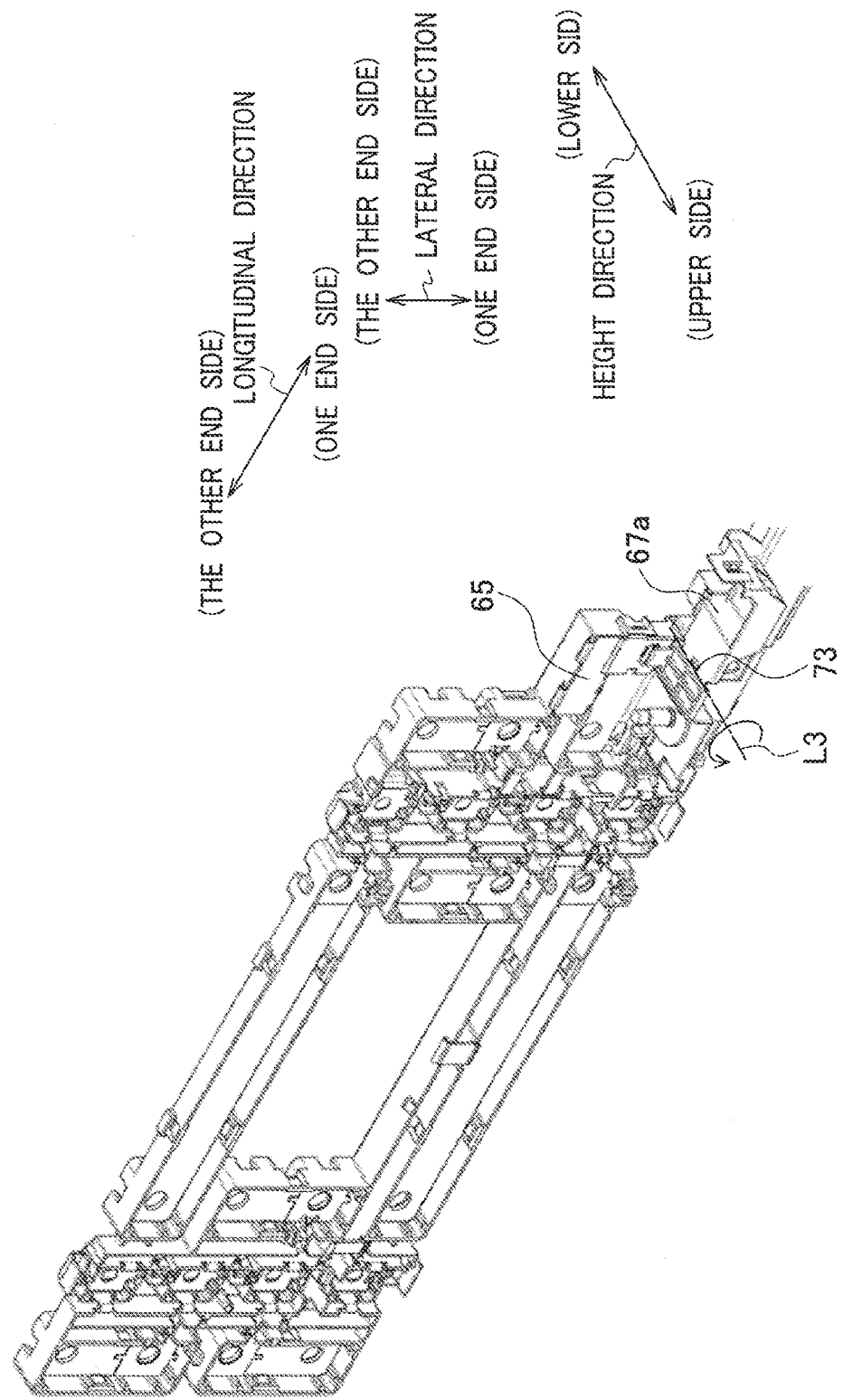

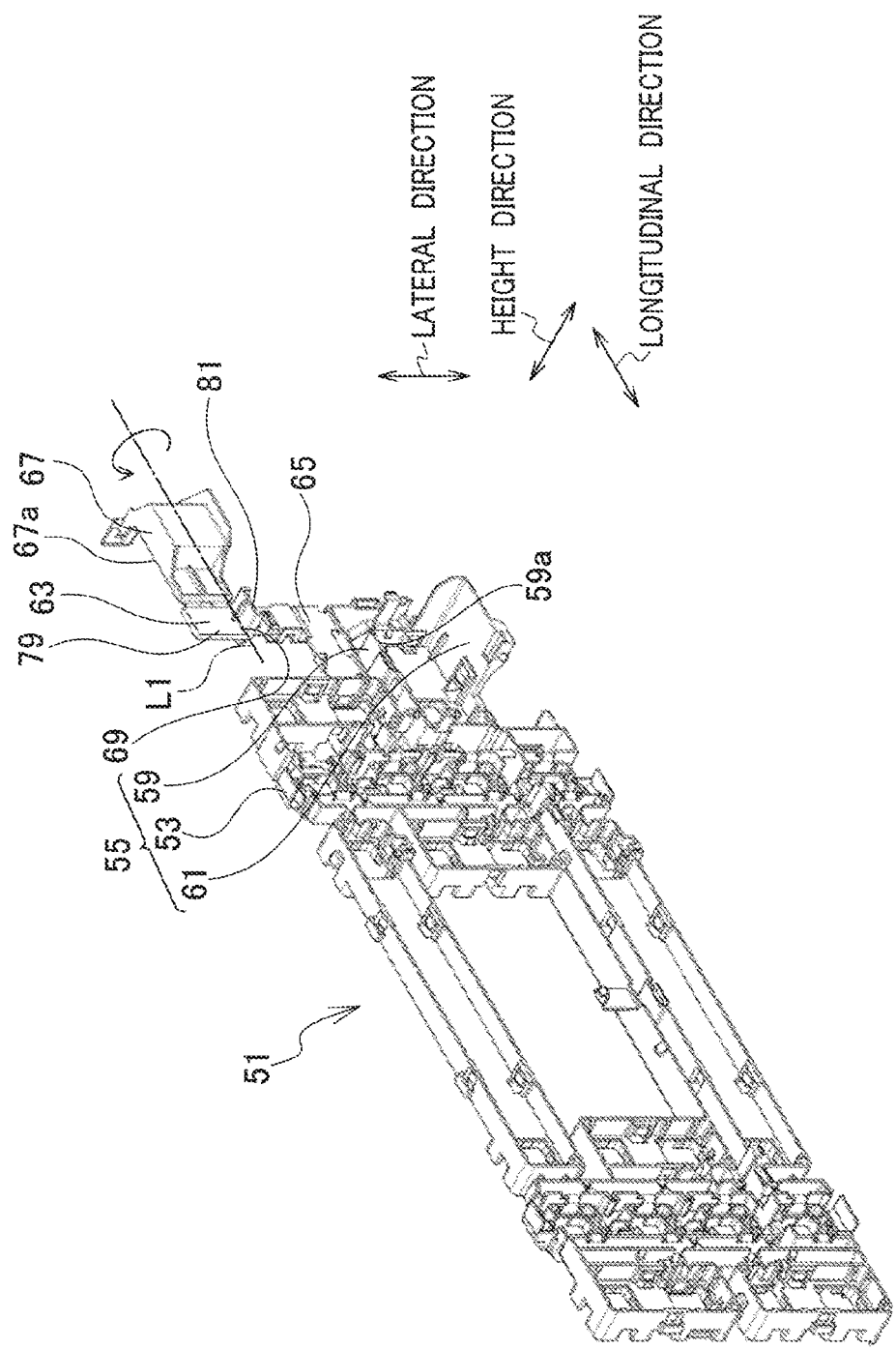

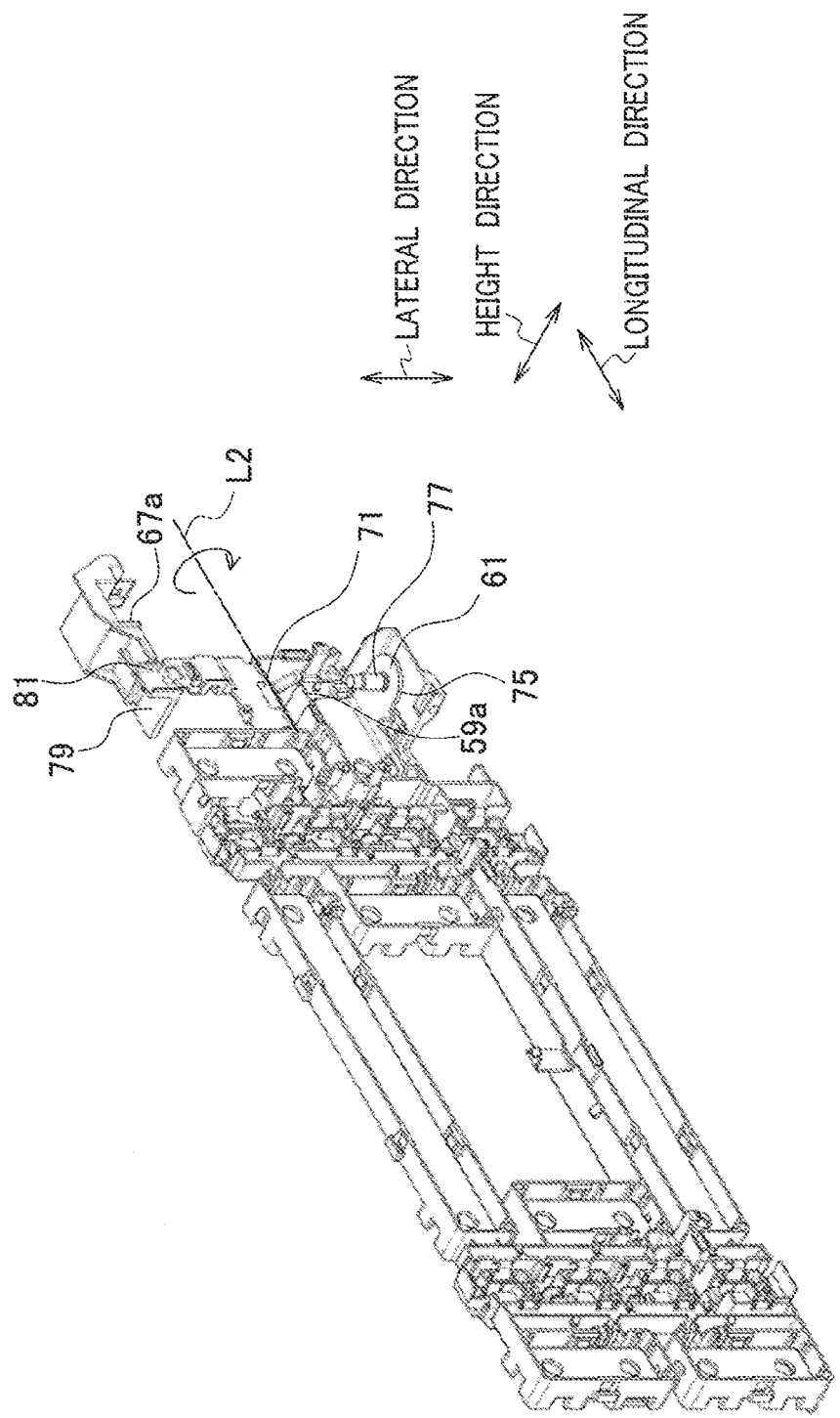

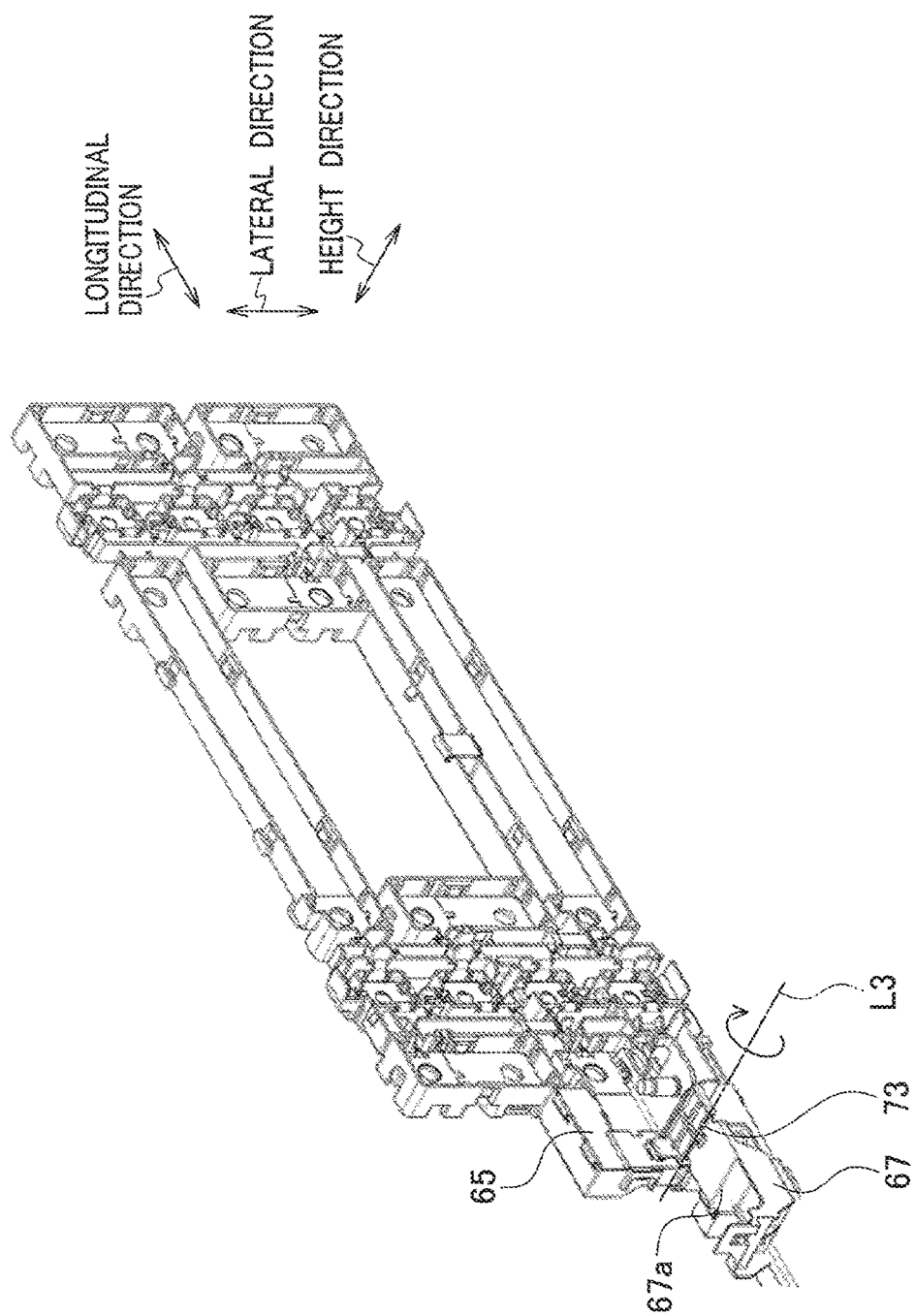

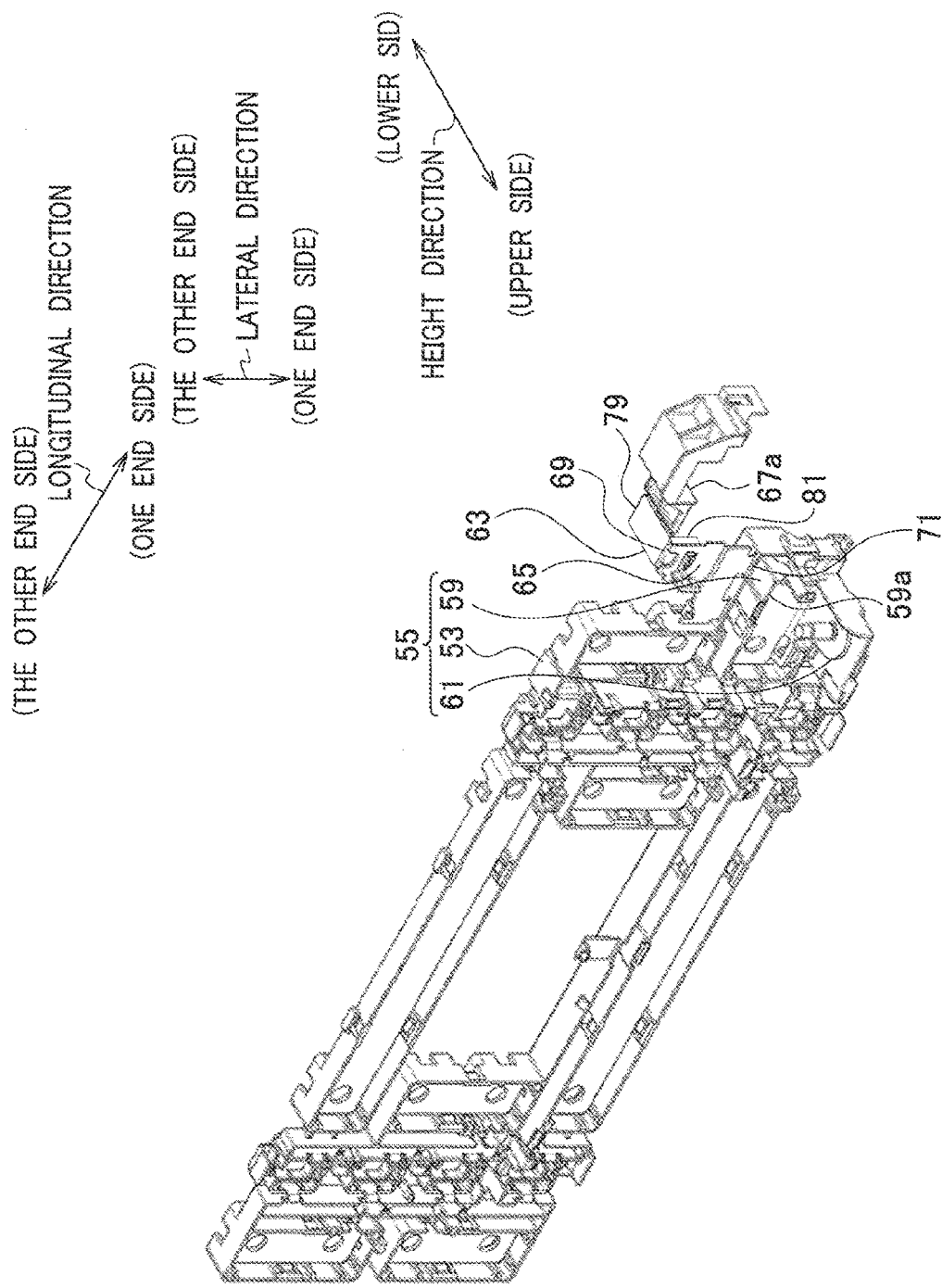

BUS BAR MODULE

TECHNICAL FIELD

The present invention relates to a bus bar module, and particularly to one having a hinge cover which covers a predetermined part by bending a hinge part.

BACKGROUND ART

Recent electric vehicles and hybrid vehicles each has a battery assembly mounted thereon as a high-power, high-output and compact power supply. To serially connect a plurality of batteries (cells) of the battery assembly, for example, a battery connecting member is used.

As the battery connecting member, there is proposed one, for example, as shown in FIGS. 1 to 6(b).

The battery assembly is composed of a plurality of batteries, each having a positive electrode and a negative electrode. For the plurality of batteries, adjacent batteries have their positive electrodes and negative electrodes disposed in an alternate arrangement in the substantially same plane. For the plurality of batteries disposed as described above to be connected in series, the battery connecting member is used.

A battery connecting member 1 includes a plurality of terminals 2, 3 and 4 to be respectively connected to a plurality of electrodes (not shown) of the batteries, a plurality of voltage-detection terminals 5 respectively disposed to partly overlap with the plurality of terminals 2, 3 and 4, and a case 10 to store the plurality of terminals 2, 3 and 4 and the plurality of voltage-detection terminals 5.

The plurality of terminals 2, 3 and 4 forms a bus bar. The bus bar consists of two end terminals 2, four short-sized electrode-connection terminals 3, and seven long-sized electrode-connection terminals 4. Each of the two end terminals 2 has one bolt hole 2a and is fastened by a nut to each of the farthest end electrodes (not shown) of the batteries in a series connection. Specifically, to one end terminal 2, a power terminal (not shown) and a voltage-detection terminal 5 are fastened together. To the other end terminal 2, only a power terminal (not shown) is fastened together. Each of the four electrode-connection terminals 3 has two bolt-holes 3a, and is fastened by a nut to each electrode of adjacent batteries (not shown), so as to serially connect the adjacent batteries. Each of the seven electrode-connection terminals 4 has two bolt-holes 4a, and is fastened by a nut to each electrode of adjacent batteries (not shown), so as to serially connect the adjacent batteries. The plurality of electrode-connection terminals 2, 3 and 4 have the plurality of voltage-detection terminals 5 fastened to them together, respectively. Each of the voltage-detection terminals 5 has a bolt-hole 5a where one of the terminals 2, 3 and 4 is partly overlapped.

The case 10 is formed by injection-molding insulating synthetic resin. The case 10 has a terminal fixing part 11 to which the plurality of terminals 2, 3 and 4 and the plurality of voltage-detection terminals 5 are fit. The terminal fixing part 11 consists of, as shown in FIGS. 1 and 2, a right block 11A, a left block 11B, and a middle connecting part 11C to connect the right block 11A to the left block 11B. On the right block 11A, one end terminal 2, three short-sized electrode-connection terminals 3, four long-sized electrode-connection terminals 4, and eight voltage-detection terminals 5 are fit to the terminal fixing part 11. On the left block 11B, one end terminal 2, one short-sized electrode-connection terminal 3, two long-sized electrode-connection terminals 4, and four voltage-detection terminals 5 are fit to the terminal fixing part 11. On the middle connecting part 11C, one long-sized electrode-connection terminal 4 is fit to the terminal fixing part 11.

As shown in FIGS. 3(a), 3(b), 4(a) and 4(b), the middle connecting part 11C of the terminal fixing part 11 has an insulating cover part 12, a pair of temporary-locking cover parts 13 and a full-locking cover part 14 integrally provided thereon.

The insulating cover part 12 is connected through hinge parts 12a to a lower edge part of the middle connecting part 11C of the terminal fixing part 11. The insulating cover part 12 is moved rotatably between a closed-position to cover an open side of the middle connecting part 11C of the terminal fixing part 11 and an opened-position not to cover the open side of the middle connecting part 11C. The insulating cover part 12 has locking arm tabs 12b. When the insulating cover part 12 is rotated to the closed-position, the locking arm tabs 12b are locked at first locked parts 11a of the terminal fixing part 11.

The insulating cover part 12 has an electric-wire guiding part 20 on the side of the outer surface of the insulating cover part 12 in the closed-position. The electric-wire guiding part 20 is formed into a rectangular tub-shape having one open side. The electric-wire guiding part 20 guides electric wires W to be connected to the plurality of voltage-detection terminals 5 or the power terminal (not shown). The electric wires W are thus pulled out from the terminal fixing part 11 along a predetermined path in an orderly manner.

The pair of temporary-locking cover parts 13 is connected through hinge parts 13a to an upper edge part of the middle connecting part 11C of the terminal fixing part 11. The pair of temporary-locking cover parts 13 is moved rotatably between a closed-position to cover the open side of the electric-wire guiding part 20 in the closed-position of the insulating cover part 12 and an opened-position not to cover the open side of the electric-wire guiding part 20. In the closed-position, the pair of temporary-locking cover parts 13 only covers a part of the open side of the electric-wire guiding part 20. Each of the temporary-locking cover parts has a locking tab 13b. When the pair of temporary-locking cover parts 13 is rotated to the closed-position, the locking tabs 13b are locked at locked parts 12c of the insulating cover part 12.

The full-locking cover part 14 is connected through hinge parts 14a to an upper edge part of the middle connection part 11C of the terminal fixing part 11. The full-locking cover part 14 is moved rotatably between a closed-position to cover the open side of the electric-wire guiding part 20 in the closed-position of the insulating cover part 12 and an opened-position not to cover the open side of the electric-wire guiding part 20. In the closed position, the full-locking cover part 14 covers the most part of the open side of the electric-wire guiding part 20. The full-locking cover part 14 has locking arm tabs 14b. When the full-locking cover part 14 is rotated to the closed-position, the locking arm tabs 14b are locked at second locked parts 11b of the terminal fixing part 11.

Next, the procedure for assembling the battery connecting member 1 will be described. Incidentally, fixing works of each electrode of the batteries to the battery connecting member 1 is omitted.

First, to the terminal fixing part 11 of the case 10 formed by injection molding, the plurality of terminals 2, 3 and 4 and the plurality of voltage-detection terminals 5 are fit. To the middle connecting part 11C of the terminal fixing part 11, while the insulating cover part 12, the temporary-locking cover part 13 and the full-locking cover part 14 are kept in the opened-position as shown in FIGS. 4(a) and 4(b), the electrode-connection terminals 4 are fit.

Next, as shown in FIGS. 5(a) and 5(b), the insulating cover part 12 is rotated from the opened-position to the closed-position. Then the locking arm tabs 12b are locked to the first locked parts 11a so that the insulating cover part 12 is locked at the closed-position. Accordingly, the insulating cover part 12 covers the open side of the middle connecting part 11C of the terminal fixing part 11.

Next, as shown with imaginary lines in FIGS. 5(a) and 5(b), the electric wires W are arranged in the electric-wire guiding part 20.

Next, as shown in FIGS. 6(a) and 6(b), the pair of temporary-locking cover parts 13 is rotated from the opened-position to the closed-position. Then the locking tabs 13b are locked to the locked parts 12c so that the pair of locking cover parts 13 is locked at the closed-position. Accordingly, the pair of locking cover parts 13 covers the part of the open side of the electric-wire guiding part 20. At the same time, the electric wires W arranged in the electric-wire guiding part 20 are temporarily held not to drop from the electric-wire guiding part 20.

Next, as shown in FIGS. 3(a) and 3(b), the full-locking cover part 14 is rotated from the opened-position to the closed-position. Then the locking arm tabs 14b are locked to the second locked parts 11b so that the full-locking cover part 14 is locked at the closed-position. This is the end of the assembly of the battery connecting member 1.

As described above, the case 10 has the terminal fixing part 11 and the insulating cover part 12. The terminal fixing part 11 fixes the plurality of terminals 2, 3 and 4. The insulating cover part 12 is supported to be moved by rotation toward the closed-position to cover the open side of the terminal fixing part 11, and has the electric-wire guiding part 20 on the outer surface in the closed-position of the insulating cover part 12. Accordingly, the electric-wire guiding part 20 is disposed at a position to overlap on the terminal fixing part 11, thereby enabling to reduce the width D (shown in FIG. 3(a)) of the battery connecting member 1 at the electric-wire guiding part.

The case 10 has the full-locking cover part 14. The full-locking cover part 14 is supported to be moved by rotation toward the closed-position to cover the open side of the electric-wire guiding part 20 in the closed-position of the insulating cover part 12. Accordingly, the full-locking cover part 14 regulates the movement of the insulating cover part 12 from the closed-position to the opened-position, thereby preventing poor insulation of the terminals 4 due to the movement of the insulating cover 12 to the closed-position. Since the open side of the electric-wire guiding part 20 is covered by the full-locking cover part 14, it prevents falling-off of the electric wires W from the electric-wire guiding part 20. That is, the full-locking cover part 14 has a full-locking function for the insulating case part 12 and a covering function (falling-off preventing function for the electric wires W) for the electric-wire guiding part 20.

The case 10 has the pair of temporary-locking cover parts 13. In the opened-position of the full-locking cover part 14, the temporary-locking cover parts 13 is located on the side of the open side of the electric-wire guiding part 20 in the closed-position of the insulating cover part 12, and is supported to be moved by rotation toward the closed-position to lock the electric-wire guiding part 20. Accordingly, before the full-locking cover part 14 is moved to the closed-position, the pair of temporary-locking cover parts 13 is moved to the closed-position, thereby preventing the insulating cover part 12 from moving from the closed-position to the opened-position, so as to improve the workability. Also, in the assembly operation, it prevents the electric wires W arranged in the electric-wire guiding part 20 from falling off the electric-wire guiding part 20. That is, the temporary-locking cover part 13 has a temporary-locking function for the insulating case part 12 and a temporary-covering function (temporary falling-off preventing function) for the electric-wire guiding part 20.

As the above-described conventional art, for example, patent literature 1 is cited.

CITATION LIST

Patent Literature

[PTL 1]
Japanese Patent Application Laid-Open Publication No. 2011-120318

SUMMARY OF INVENTION

Technical Problem

Incidentally, the resin case 10 of the conventional battery connecting member 1 shown in FIGS. 1 to 6(b) is configured to have the plurality of hinge covers where one hinge cover is closed to protect the bus bar and the others are closed to protect the electric wires.

The plurality of hinge covers is configured to be independently opened or closed from each other, thereby protecting the electric wires and the bus bar. However, in the resin case 10 of the conventional battery connecting member 1, there is a possibility to limit arrangement forms of each of the hinge covers and corresponding hinge parts for the resin case 10 (directions of hinge covers and hinge parts, etc.).

Regarding the above-described problem, there is a possibility that not only the battery connecting member but also a bus bar module configured to have a bus bar and a metallic material has the same problem.

In view of the foregoing problem, the object of the present invention is to provide a bus bar module having one or more parts which should be protected provided on a body part configured to have a metallic material and a case made of synthetic resin, the bus bar module capable of enhancing the flexibility in locating forms of hinge covers to cover the parts which should be protected and hinge parts corresponding to the hinge covers.

Solution to Problem

According to a first aspect of the present invention, there is provided a bus bar module having a first part and a second part provided on a body part configured to have a metallic material and a case made of synthetic resin, the bus bar module comprising: a first hinge cover connected directly or indirectly through a first hinge part to the case of the body part; a second hinge cover connected directly or indirectly through a second hinge part to the case of the body part; and a third hinge cover connected directly or indirectly through a third hinge part to the case of the body part; wherein the first to third hinge covers and the first to third hinge parts are made of synthetic resin and integrally formed with the case of the body part, wherein in an initial state of the bus bar module, an undercut part does not exist in the case of the body part, the first to third hinge covers and the first to third hinge parts, the second hinge cover is bent at the second hinge part at a predetermined angle so that at least a part of the second hinge cover covers the first part, the first hinge cover is bent at the first hinge part at a predetermined angle, and the third hinge cover is bent at the third hinge part at a predetermined angle so that at least apart of the third hinge cover covers the second part.

According to a second aspect of the present invention, the second hinge cover is connected through the second hinge part to the case of the body part, the first hinge cover is connected through the first hinge part to the second hinge cover, and the third hinge cover is connected through the third hinge part to the first hinge cover.

According to a third aspect of the present invention, in the initial state, a first straight bent line at the first hinge part and a second straight bent line at the second hinge part extend in parallel each other, and a third straight bent line at the third hinge part and the first straight bent line at the first hinge part are perpendicular to each other.

According to a fourth aspect of the present invention, there is provided a bus bar module comprising: a body part configured to have a metallic material and a case made of synthetic resin; and one or more parts provided on the body part, wherein the bus bar module is configured to have, through hinge parts whose number is greater than the number of the parts, hinge covers whose number is greater than the number of the parts, directly or indirectly connected to the case of the body part, each of the hinge covers and each of the hinge parts made of synthetic resin and integrally formed with the case of the body part, and each hinge cover are bent at each hinge part at a predetermined angle so that each part is covered.

Advantageous Effects of Invention

According to the present invention, in a bus bar module having one or more parts which should be protected provided on a body part configured to have a metallic material and a case made of synthetic resin, it is possible to enhance the flexibility in locating forms of hinge covers to cover the parts which should be protected and hinge parts corresponding to the hinge covers.

BRIEF DESCRIPTION OF DRAWINGS

FIG. 3(a) is a view showing the schematic configuration of the conventional battery connecting member. FIG. 3(b) is a view showing the schematic configuration of the conventional battery connecting member.

FIG. 5(a) is a view showing the schematic configuration of the conventional battery connecting member. FIG. 5(b) is a view showing the schematic configuration of the conventional battery connecting member.

FIG. 6(a) is a view showing the schematic configuration of the conventional battery connecting member. FIG. 6(b) is a view showing the schematic configuration of the conventional battery connecting member.

FIG. 7(a) is a top view showing a schematic configuration of a bus bar module according to an embodiment of the present invention. FIG. 7(b) is a front view showing the schematic configuration of the bus bar module according to the embodiment of the present invention. FIG. 7(c) is a bottom view showing the schematic configuration of the bus bar module according to the embodiment of the present invention.

FIG. 8(a) is a top view showing the schematic configuration of the bus bar module according to the embodiment of the present invention. FIG. 8(b) is a front view showing the schematic configuration of the bus bar module according to the embodiment of the present invention. FIG. 8(c) is a bottom view showing the schematic configuration of the bus bar module according to the embodiment of the present invention.

FIG. 9(a) is a top view showing the schematic configuration of the bus bar module according to the embodiment of the present invention. FIG. 9(b) is a front view showing the schematic configuration of the bus bar module according to the embodiment of the present invention. FIG. 9(c) is a bottom view showing the schematic configuration of the bus bar module according to the embodiment of the present invention.

FIG. 10(a) is a top view showing the schematic configuration of the bus bar module according to the embodiment of the present invention. FIG. 10(b) is a front view showing the schematic configuration of the bus bar module according to the embodiment of the present invention. FIG. 10(c) is a bottom view showing the schematic configuration of the bus bar module according to the embodiment of the present invention.

FIG. 11(c) is a perspective view showing the schematic configuration of the bus bar module according to the embodiment of the present invention.

FIG. 12(a) is a perspective view showing the schematic configuration of the bus bar module according to the embodiment of the present invention. FIG. 12(b) is a perspective view showing the schematic configuration of the bus bar module according to the embodiment of the present invention.

FIG. 14(c) is a perspective view showing the schematic configuration of the bus bar module according to the modified example of the embodiment of the present invention.

FIG. 15 is a perspective view showing a schematic configuration of a bus bar module according to a modified example of the embodiment of the present invention, corresponding to FIG. 11(b).

DESCRIPTION OF EMBODIMENTS

Figure 1:
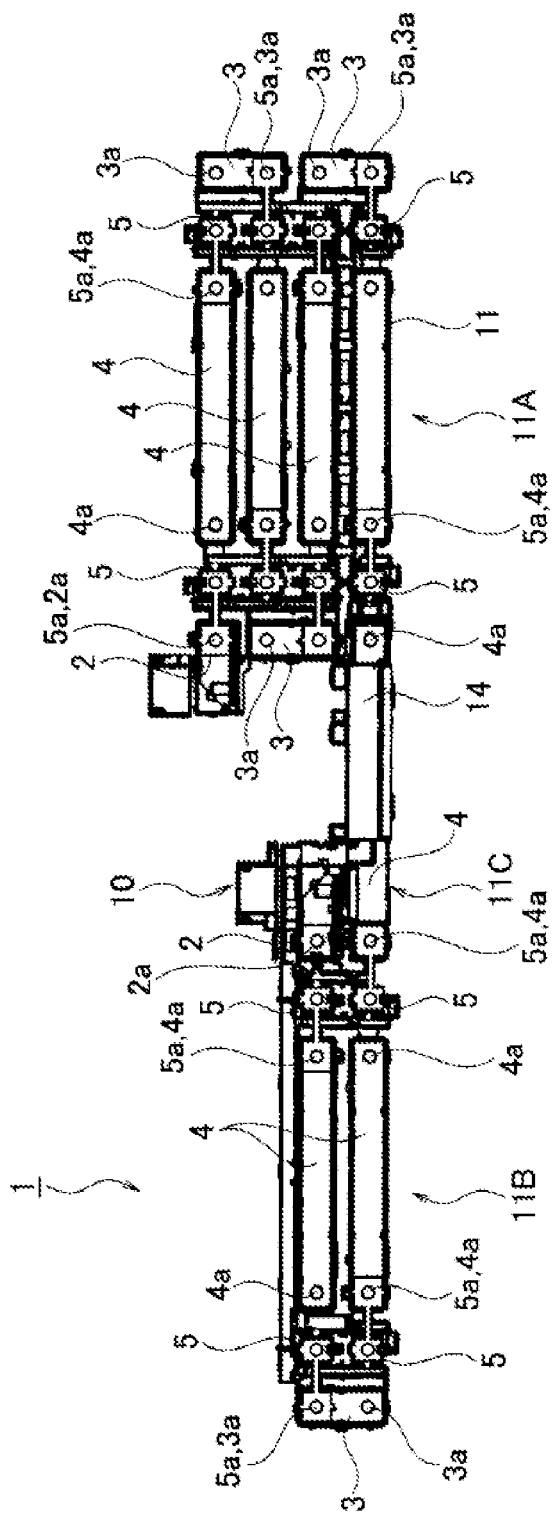
FIG. 1 is a view showing a schematic configuration of a conventional battery connecting member.
Figure 2:
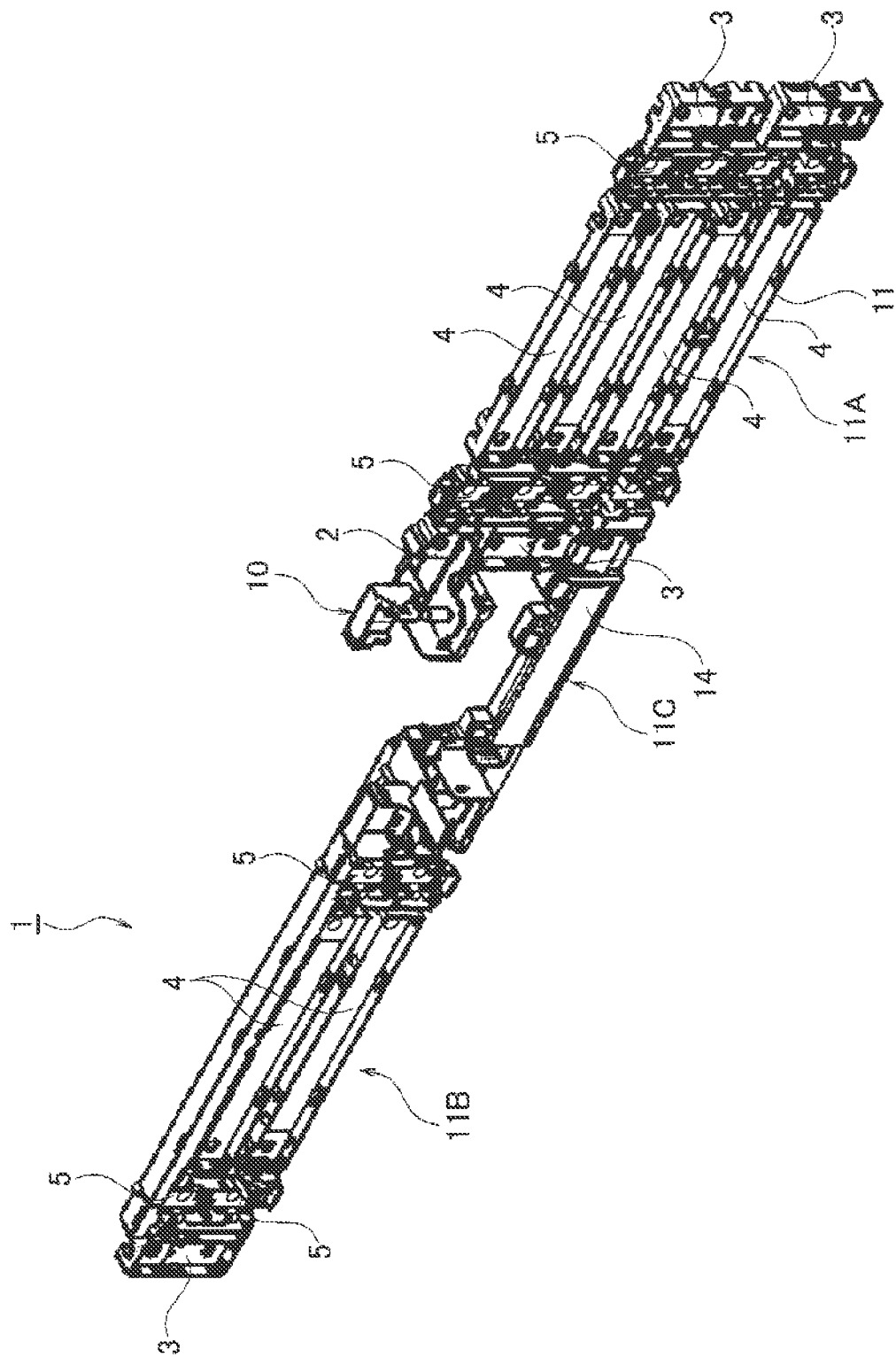
FIG. 2 is a view showing the schematic configuration of the conventional battery connecting member.
Figure 4:
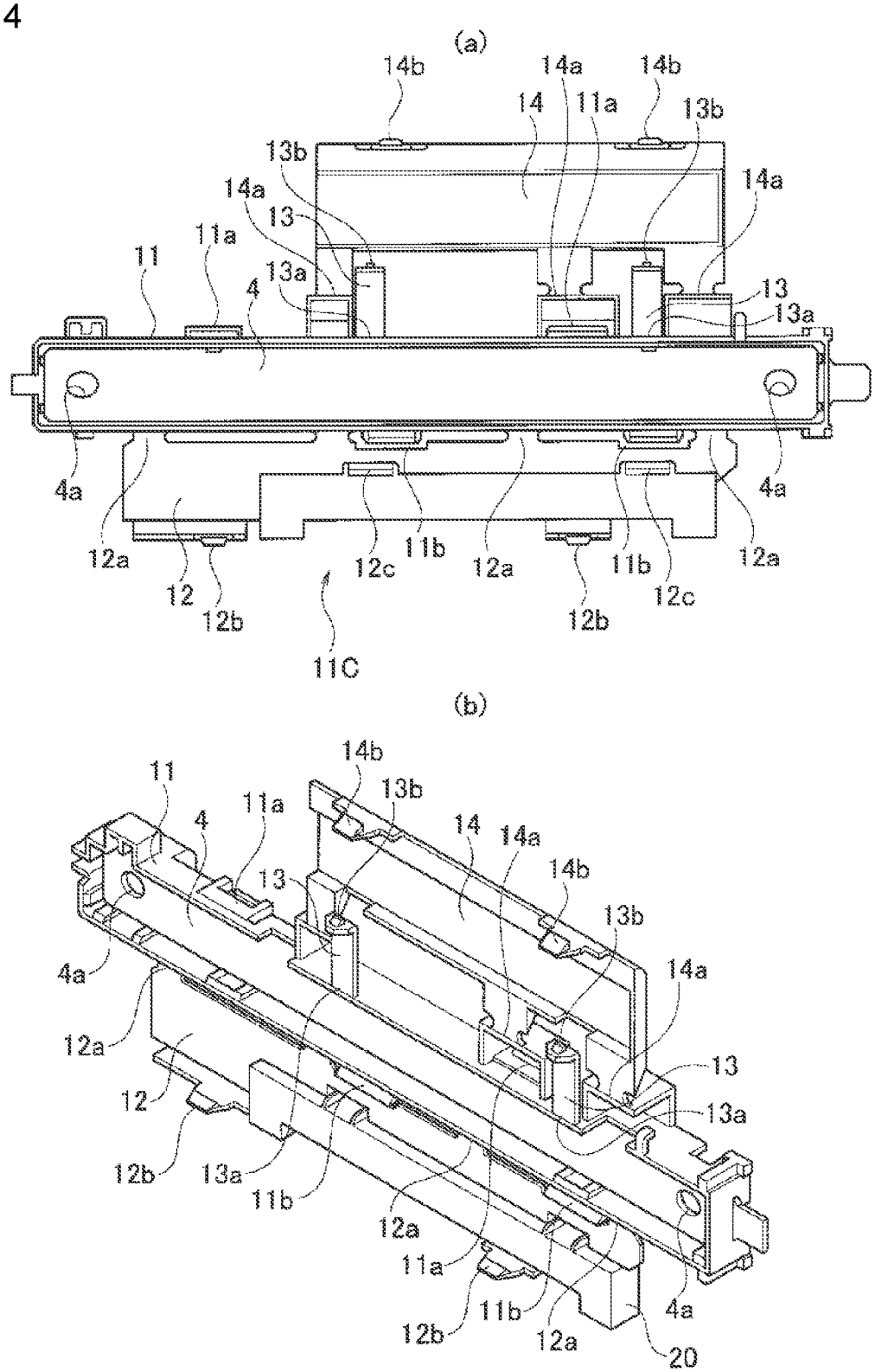
FIG. 4(a) is a view showing the schematic configuration of the conventional battery connecting member.
FIG. 4(b) is a view showing the schematic configuration of the conventional battery connecting member.

As with the conventional battery connecting member, a bus bar module 51 is used, for example, for a series connection of a plurality of batteries. Hereinafter a bas bar module will be described as a battery connecting member. As shown in FIGS. 7(a) to 7(c) and 11(a) to 11(c), a battery connecting member 51 is made of insulating synthetic resin, and has a body part 55 configured to have a case (housing) 53 formed, for example, by injection molding, and a metallic material (not shown) such as a bas bar, etc.

For the battery connecting member 51, by fitting the metallic material to the case 53 or insert-molding the case 53 into the metallic material, etc., the case 53 and the metallic material are integrated.

The metallic material includes, for example, a plurality of terminals to be connected to a plurality of electrodes (not shown) of batteries, respectively, and voltage-detection terminals disposed to partly overlap with the terminals. The terminals are set up at a terminal fixing part 57 provided on the case 53.

The body part 55 is provided with a first part 59 which should be protected by putting a cover thereon necessarily or preferably and a second part 61 which should be protected by putting a cover thereon necessarily or preferably. The first part 59 and the second part 61 are disposed, for example, closely each other.

According to the present embodiment, the first part 59 is a wire guiding path for electric wires etc. (part for arranging wires such as electric wires along a predetermined path). The second part 61 is a bus bar part with a caulking bolt (part where a bus bar and a male screw are exposed from the case 53).

The battery connecting member 51 is configured to have a first hinge cover 63, a second hinge cover 65 and a third hinge cover 67.

The first hinge cover 63 is connected directly or indirectly through a first hinge part 69 (for example, a hinge part configured with a self-hinge which is thinner than other parts) to the case 53 of the body part 55. The second hinge cover 65 is directly or indirectly connected through a second hinge part 71 (for example, a hinge part configured with a self-hinge which is thinner than other parts) to the case 53 of the body part 55. The third hinge cover 67 is directly or indirectly connected through a third hinge part 73 (for example, a hinge part configured with a self-hinge which is thinner than other parts) to the case 53 of the body part 55.

The hinge covers 63, 65 and 67 and the hinge parts 69, 71 and 73 are made of synthetic resin (composed of synthetic resin) as with the case 53 and integrally molded with the case 53 of the body part 55.

Specifically, the second hinge cover 65 is directly connected through the second hinge part 71 to the case 53 of the body part 55.

Also, the first hinge cover 63 is directly connected through the first hinge part 69 to the second hinge cover 65. The third hinge cover 67 is directly connected through the third hinge part 73 to the first hinge cover 63. That is, the hinge covers 63, 65 and 67 and the hinge parts 69, 71 and 73 are serially connected in the order of the second hinge part 71, the second hinge cover 65, the first hinge part 69, the first hinge cover 63, the third hinge part 73 and the third hinge cover 67, and protrude from the case 53 of the body part 55.

In the initial state of the battery connecting member 51 (hinge covers 63, 65 and 67 are not bent at the hinge parts 69, 71 and 73), there is no undercut part at the case 53 of the body part 55 (at least around the hinge part 71 of the case 53), the hinge covers 63, 65 and 67 and the hinge parts 69, 71 and 73.

That is, a die for integrally molding the case 53 of the body part 55, the hinge covers 63, 65 and 67 and the hinge parts 69, 71 and 73, for example, by mold-forming has no slide structure using angular pins, etc. The die is configured simply with an upper die and a lower die which contact or leave from each other at a parting line.

Specifically, the lower die exists on the back side of the plane of paper in FIG. 7(b), and the upper die exists on the near side of the plane of paper in FIG. 7(b), where the upper die is simply moved toward the lower die relatively in the direction perpendicular to the plane of paper in FIG. 7(b), thereby molding the case 53, the hinge covers 63, 65 and 67 and the hinge parts 69, 71 and 73.

The battery connecting member 51 is configured to have the second hinge cover 65 bent at the second hinge part 71 at a predetermined angle (for example, 180-degree angle), thereby covering the first part 59 with at least a part of the second hinge cover 65.

Also, the battery connecting member 51 is configured to have the first hinge cover 63 bent at the first hinge part 69 at a predetermined angle (for example, 90-degree angle) and the third hinge cover 67 bent at the third hinge part 73 at a predetermined angle (for example, 180-degree angle), thereby covering the second part 61 with at least a part of the third hinge cover 67.

Here, the configuration of the battery connecting member 51 will be described in more detail.

For convenience in description, three directions perpendicular one another in the space are defined as a longitudinal direction, a lateral direction, and a height direction.

In the initial state of the battery connecting member 51, as shown in FIGS. 7(a) to 7(c), a straight bent line L1 (first bent line extending in the longitudinal direction) at the first hinge part 69 and a straight bent line L2 (second bent line extending in the longitudinal direction) at the second hinge part 71 extend in parallel each other. A straight bent line L3 (third bent line extending in the lateral direction) at the third hinge part 73 is perpendicular to the straight bent line L1 (first bent line) at the first hinge part 69.

The first bent line L1, the second bent line L2 and the third bent line L3 exist, for example, on a plane or slightly away from the plane.

The first part (wire guiding path made of resin) 59 is integrally molded with the case 53 and formed in an L-shape and square-tub shape. The first part 59 is disposed on one end side of the body part 55 in the longitudinal direction, and at a middle part of the body part 55 in the lateral direction. Also, the first part 59 is open toward the upper side (near side of the plane of paper in FIG. 7(b), etc.) in the height direction (see also FIG. 11(a)).

One extending part of the first part 59 extends in the longitudinal direction and the other extending part of the first part 59 extends in the lateral direction. The first part 59 has one end (one end side in the longitudinal direction) of the one extending part and the other end (the other end side in the lateral direction) of the other extending part connected each other.

This allows electric wires (not shown) to be guided to enter the wire guiding path 59 from the other end in the longitudinal direction of the one extending part of the first part 59 to extend in the first part 59 to be bent in an L-shape and goes out from one end in the lateral direction of the other extending part of the first part 59.

Figure 11A:
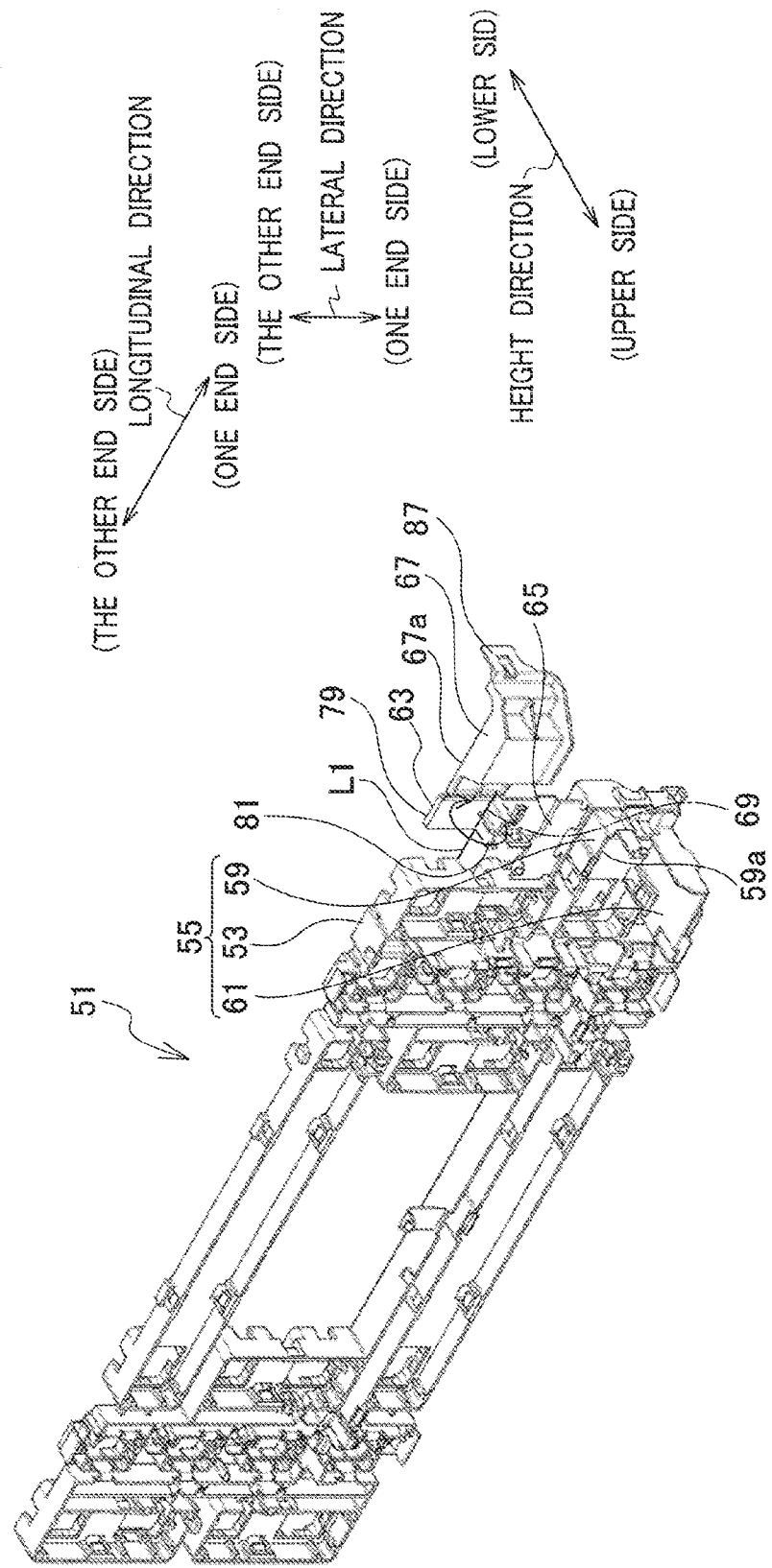
FIG. 11(a) is a perspective view showing the schematic configuration of the bus bar module according to the embodiment of the present invention.
Figure 11B:
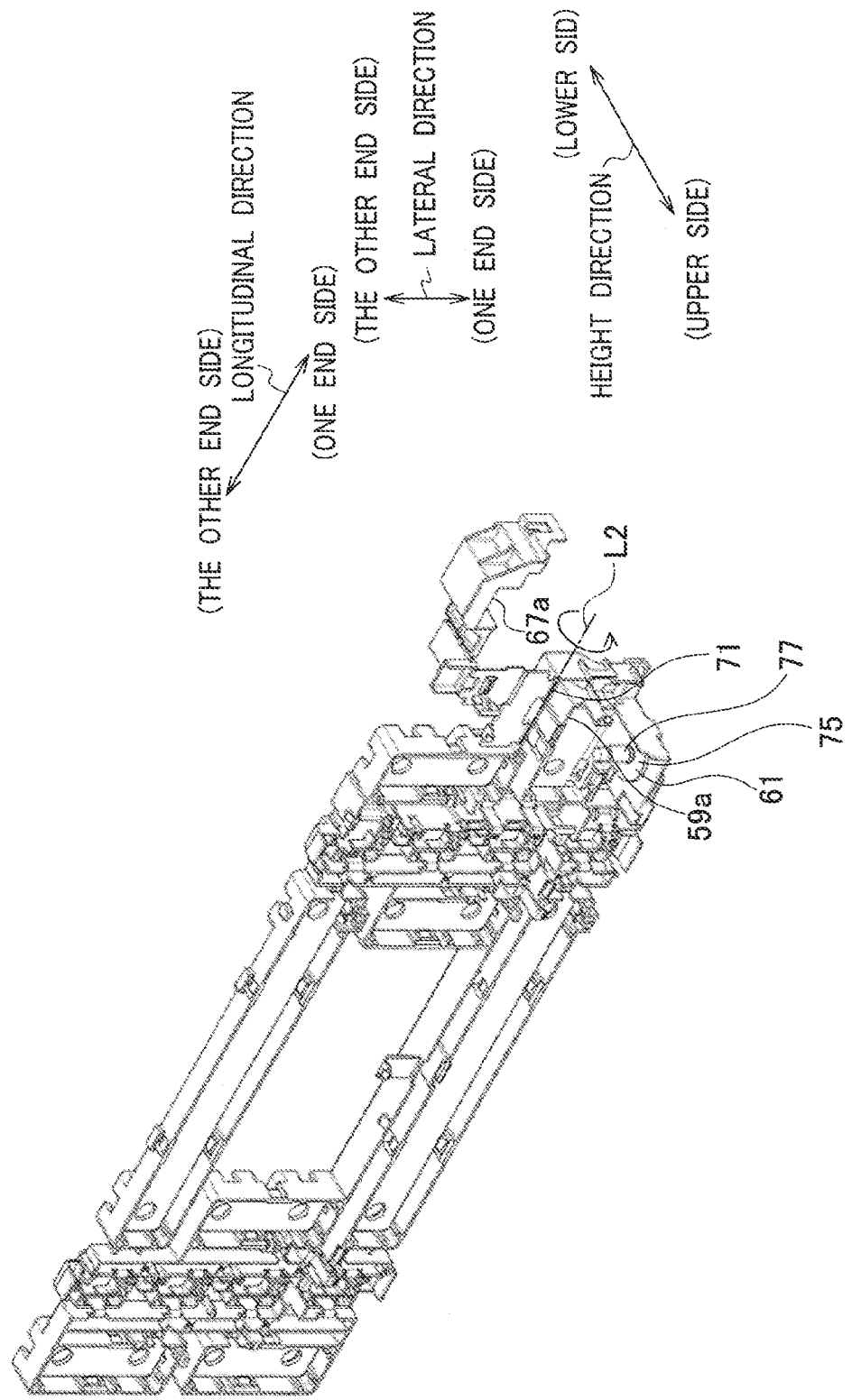
FIG. 11(b) is a perspective view showing the schematic configuration of the bus bar module according to the embodiment of the present invention.
Figure 12C:
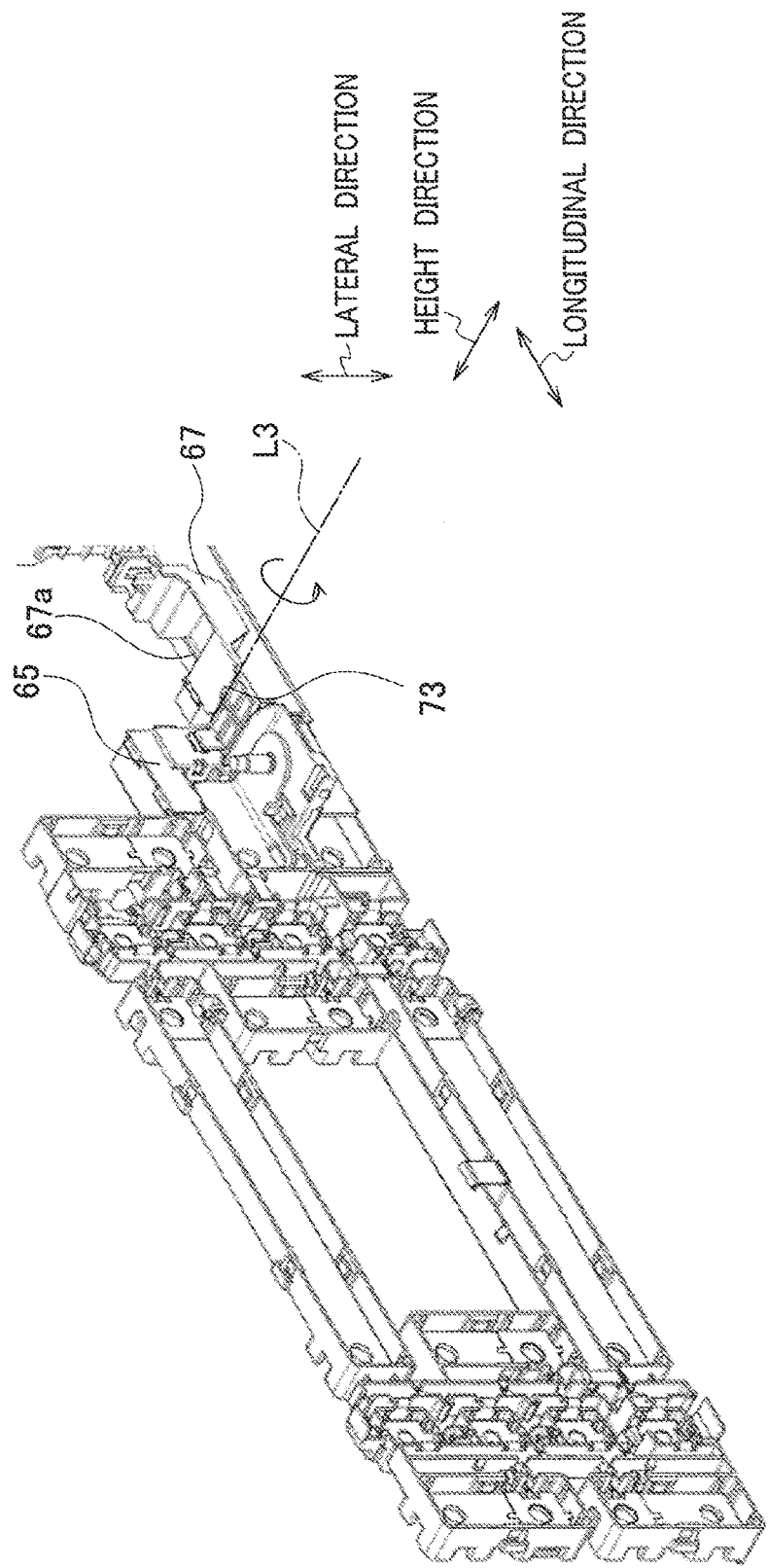
FIG. 12(c) is a perspective view showing the schematic configuration of the bus bar module according to the embodiment of the present invention.

The second part (bus bar part with male screw) 61 is integrally formed with the bus bar 75 and configured to have a male screw 77 protruding from the bus bar 75 (See FIGS. 8(b), 11(b), etc.).

The second part 61 is disposed in the vicinity of the first part 59. The second part 61 is disposed, in the longitudinal direction, closer to the other end than the first part 59 and, in the lateral direction, closer to the one end than the first part 59. The male screw 77 extends in the lateral direction.

The second part 61 is integrally formed with the case 53 (body part 55) by molding the case 53 and then fitting the bus bar 75 to a predetermined part of the case 53.

Next, a positional relationship between the hinge covers 63, 65 and 67 and the hinge parts 69, 71 and 73 in the initial state of the battery connecting member 51 will be described.

The second hinge part 71 is, as shown in FIG. 7(b), etc., disposed at an edge (linear edge located on the other end side in the lateral direction) of an opening 59a of the one extending part of the first part 59. The second hinge cover 65 is formed in an L-shape and in the form of a flat plate. The second hinge cover 65 in the thickness direction corresponds to the battery connecting member 51 in the height direction. The first part 59 and the second hinge cover 65 are almost symmetrical with respect to the second hinge part 71.

The first hinge part 69 is, as shown in FIG. 7(b), etc., disposed on an end of the second hinge cover 65 (linear end located on the other end side in the lateral direction). The first hinge cover 63 has a form of two rectangular flat plates 79 and 81 connected in an L-shape.

The flat plate 79 in the thickness direction corresponds to the battery connecting member 51 in the height direction. The flat plate 81 in the thickness direction corresponds to the battery connecting member 51 in the lateral direction. A position of an angular part where the flat plates 79 and 81 are connected corresponds to the position of the first hinge part 69. The flat plate 79 protrudes from the first hinge part 69 to the other end side in the lateral direction. The flat plate 81 protrudes from the first hinge part 69 to the upper side in the height direction (see also FIG. 11(a)).

The third hinge part 73 is, as shown in FIG. 7(b), disposed on an end (liner end located on the one end side in the longitudinal direction) of the flat plate 79 of the first hinge cover 63. The third hinge cover 67 is formed in a square shape having a rectangular opening, and opens toward the lower side in the height direction (see also FIG. 11(a)). Also, the third hinge part 73 is located on one side (one side existing on the other end side in the longitudinal direction) of the opening 67a of the third hinge cover 67.

The second hinge cover 65 has a locked part 83 provided thereon. The case 53 of the body part 55 has a locking part 85 provided thereon, which locks the locked part 83 of the second hinge cover 65. The second hinge cover 65 is bent at the second hinge part 71 (the second bent line L2) at 180-degree angle so that the locked part 83 is locked to the locking part 85, thereby fixing the second hinge cover 65 to the case 53. This allows the opening 59a of the first part 59 to be covered by the second hinge cover 65.

The third hinge cover 67 has a locked part 87 provided thereon. The case 53 of the body part 55 has a locking part 89 provided thereon, which locks the locked part 87 of the third hinge cover 67. The first hinge cover 63 is bent at the first hinge part 69 (first bent line L1) at 90-degree angle, and then the third hinge cover 67 is bent at the third hinge part 73 (third bent line L3) at 180-degree angle so that the locked part 87 is locked to the locking part 89, thereby fixing the third hinge cover 67 to the case 53. This allows the second part 61 to be covered with the third hinge cover 67.

Even though the second part 61 is covered with the third hinge cover 67, the electric wires are guided in a cutout 91, thereby extending from the second part 61 out of the third hinge cover 67.

Incidentally, a configuration may have a locked part (not shown) provided on the first hinge cover 63 and a locking part (not shown) provided on the second hinge cover 65, and the first hinge cover 63 is bent at the first hinge part 69 at 90-degree angle so that the locked part of the hinge cover 63 is locked to the locking part of the second hinge cover 65, thereby fixing the first hinge cover 63 to the second hinge cover 65.

Although, in FIG. 11(a), the flat plate 81 protrudes from the first hinge part 69 toward the upper side in the height direction, the flat pate 81 may protrude from the first hinge part 69 (flat plate 79) toward the lower side in the height direction. That is, in FIG. 7(b), although the flat plate 81 protrudes from the first hinge part 69 toward the near side of the plane of paper, it may protrude from the first hinge part 69 (flat plate 79) toward the back side of the plane of paper.

At that time, the locked part of the first hinge cover 63 may be provided on the flat plate 81 which protrudes from the flat plate 79 toward the lower side in the height direction.

In the configuration, when the first hinge cover 63 is bent at the first hinge part 69 at 90-degree angle, as shown in FIG. 15, the flat plate 81 overlaps the second hinge cover 65, and the locked part provided on the flat plate 81 is locked to the locking part provided on the second hinge cover 65.

Next, the procedure for covering the first part 59 and the second part 61 with the hinge covers 63, 65 and 67 will be described.

First, in the initial state of the battery connecting member 51 as shown in FIGS. 7(a) to 7(c), 11(a) and 12(a), the bus bar 75 and the male screw 77 are set in the case 53 of the body part 55 (that is, the second part 61 is formed), and the first hinge cover 63 is bent at the first bent line L1 at 90-degree angle, so that the battery connecting member 51 has an arrangement shown in FIGS. 8(a) to 8(c), 11(b) and 12(b). In this state, the third hinge cover 67 opens toward the one end side in the lateral direction.

Next, the second hinge cover 65 is bent at the second bent line L2 at 180-degree angle, so that the battery connecting member 51 has an arrangement shown in FIGS. 9(a) to 9(c), 11(c) and 12(c). In this state, the locked part 83 is locked to the locking part 85, and the second hinge cover 65 is fixed to the case 53. This allows the first part 59 to be covered with the second hinge cover 65 and the third hinge cover 67 to open toward the other end side in the lateral direction.

Next, the third hinge cover 67 is bent at the third bent line L3 at 180-degree angle, so that the battery connecting member 51 becomes as shown in FIGS. 10(a) to 10(c). In this state, the locked part 87 is locked to the locking part 89 and the third hinge cover 67 is fixed to the case 53. This allows the second part 61 to be covered with the third hinge cover 67.

According to the battery connecting member 51, comparing to the number of parts (first part 59 and second part 61) which should be covered by hinge covers, the number of hinge covers (first to third hinge covers 63, 65 and 67) and the number of hinge parts (first to third hinge parts 69, 71 and 73) are greater by one. Therefore, this avoids having limitations on arrangement forms of each hinge cover and corresponding hinge parts with respect to the case 53 (directions of the hinge covers 63, 65 and 67 and the hinge parts 69, 71 and 73, etc.) As a result, it enhances the flexibility of arrangement forms of the hinge covers to cover the parts which should be protected and the hinge parts corresponding to the hinge covers.

According to the battery connecting member 51, the number of hinge covers and the number of hinge parts are increased in order to have no undercut parts among the case 53 of the main body 55, the first to third hinge covers 63, 65 and 67, and the first to third hinge parts 69, 71 and 73. Therefore, it simplifies the configuration of the mold to be used to form the battery connecting member 51 (specifically, the case 53 and the hinge covers 63, 65 and 67 and the hinge parts 69, 71 and 73).

According to the battery connecting member 51, the first part 59 is configured to be covered with the second hinge cover 65, so as to prevent the electric wires guided through the first part (wire guiding path) 59 from going out from the wire guiding path. Therefore, it prevents a biting or a short (short-circuit) of the electric wires.

According to the battery connecting member 51, the second part 61 is configured to be covered with the third hinge cover 67, so that the second part 61 is protected and besides that, the third hinge cover 67 is bent properly at the third hinge part 73 to cover or expose the second part 61. This facilitates the work for connecting outer devices to electrodes and the work for maintaining the batteries.

Figure 13A:
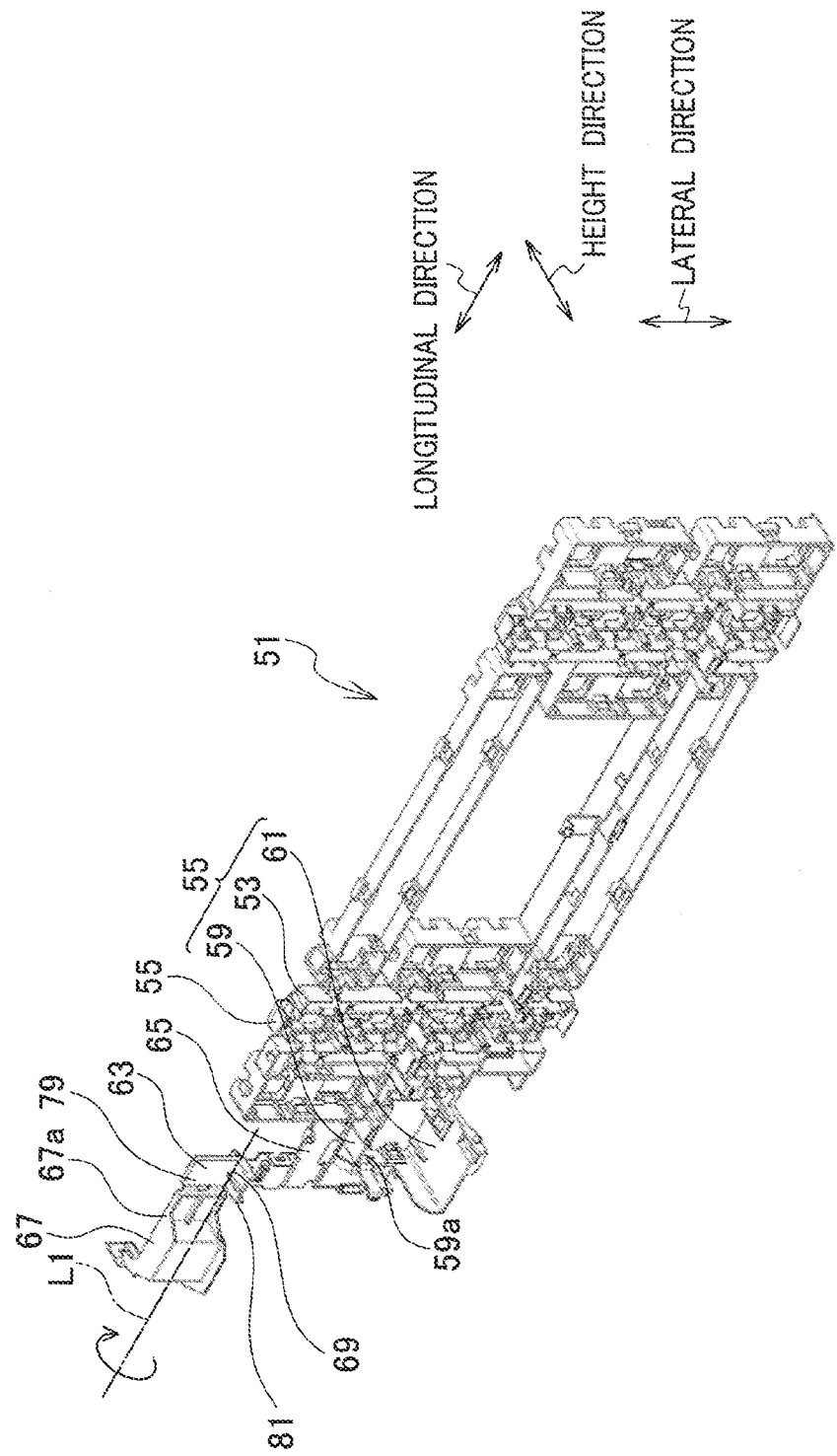
FIG. 13(a) is a perspective view showing a schematic configuration of a bus bar module according to a modified example of the embodiment of the present invention.
Figure 13B:
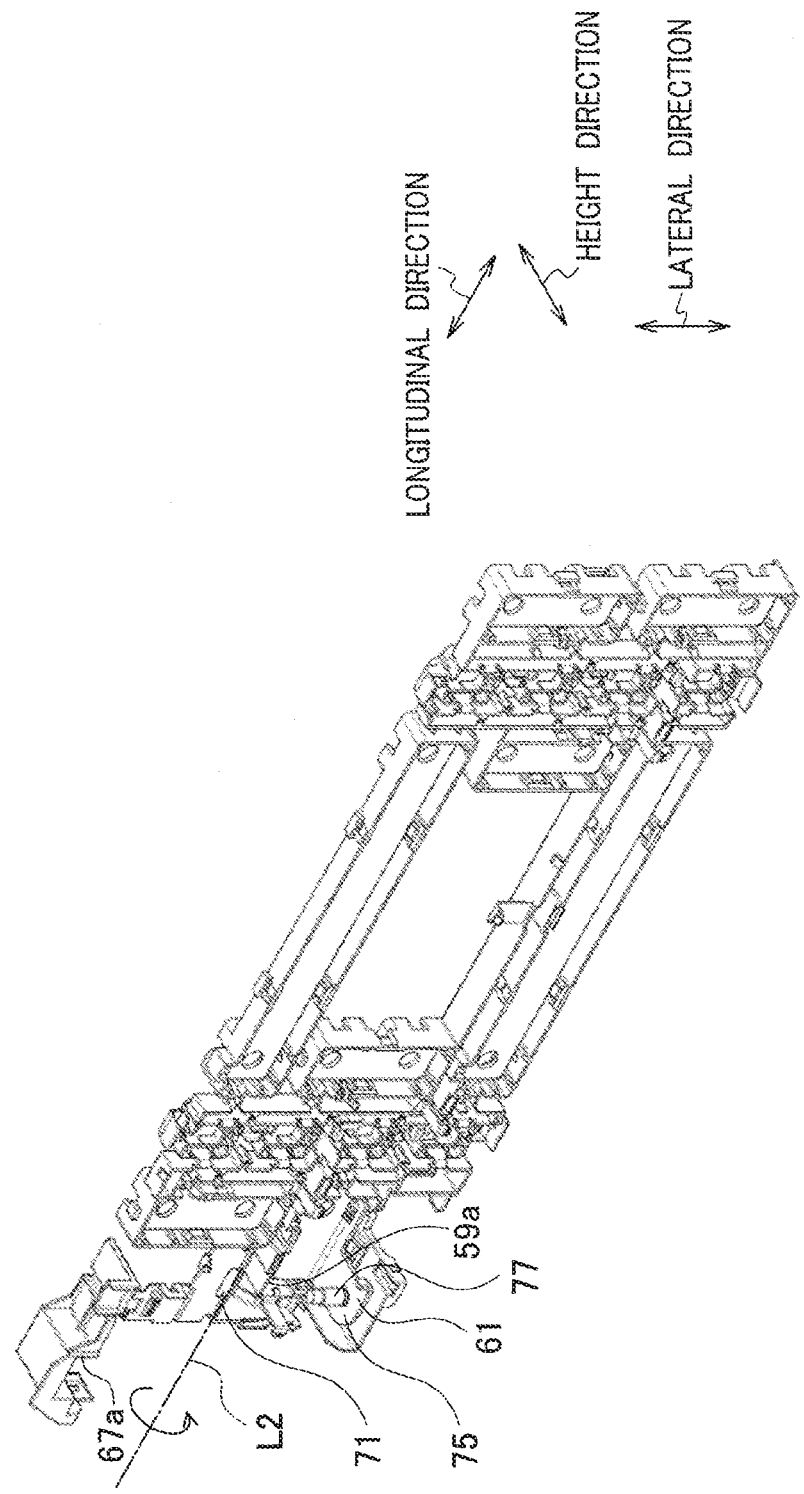
FIG. 13(b) is a perspective view showing the schematic configuration of the bus bar module according to the modified example of the embodiment of the present invention.
Figure 13C:
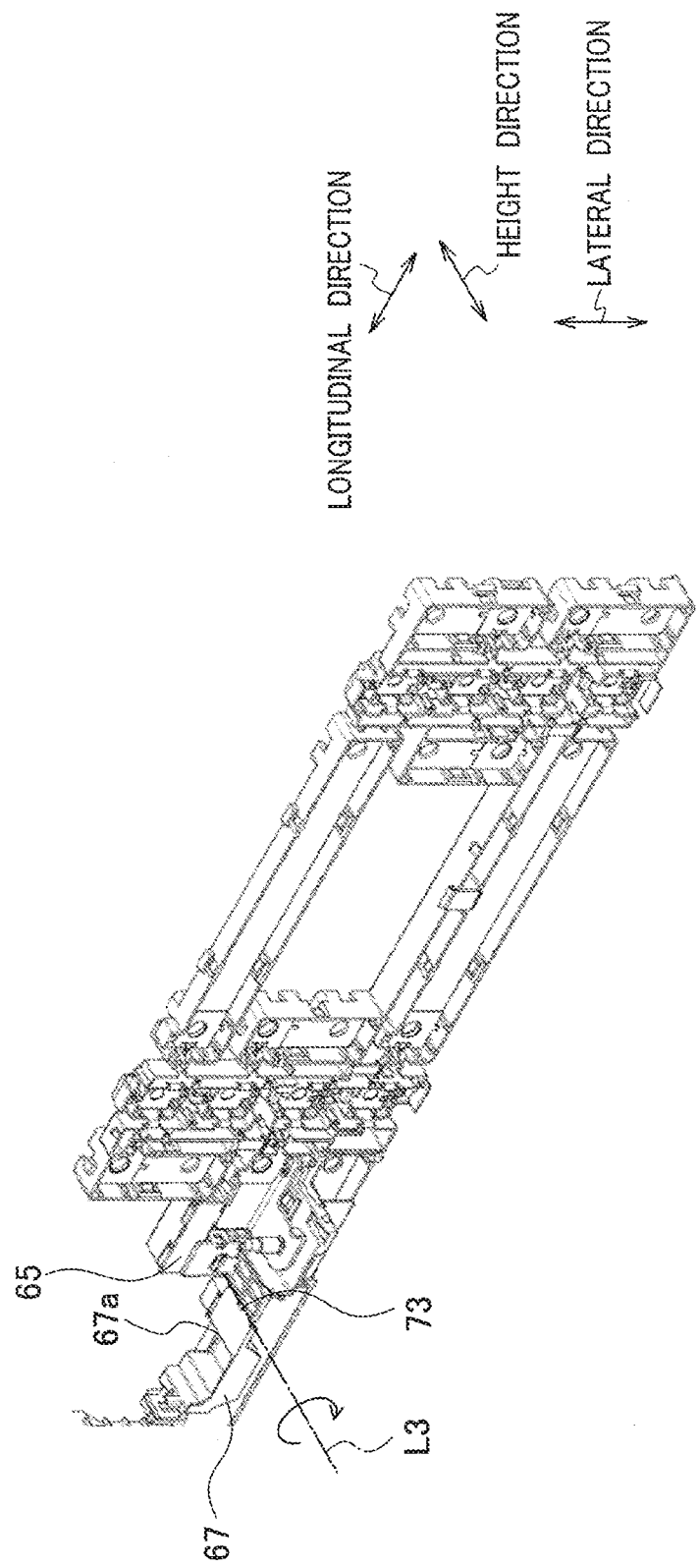
FIG. 13(c) is a perspective view showing the schematic configuration of the bus bar module according to the modified example of the embodiment of the present invention.
Figure 14A:
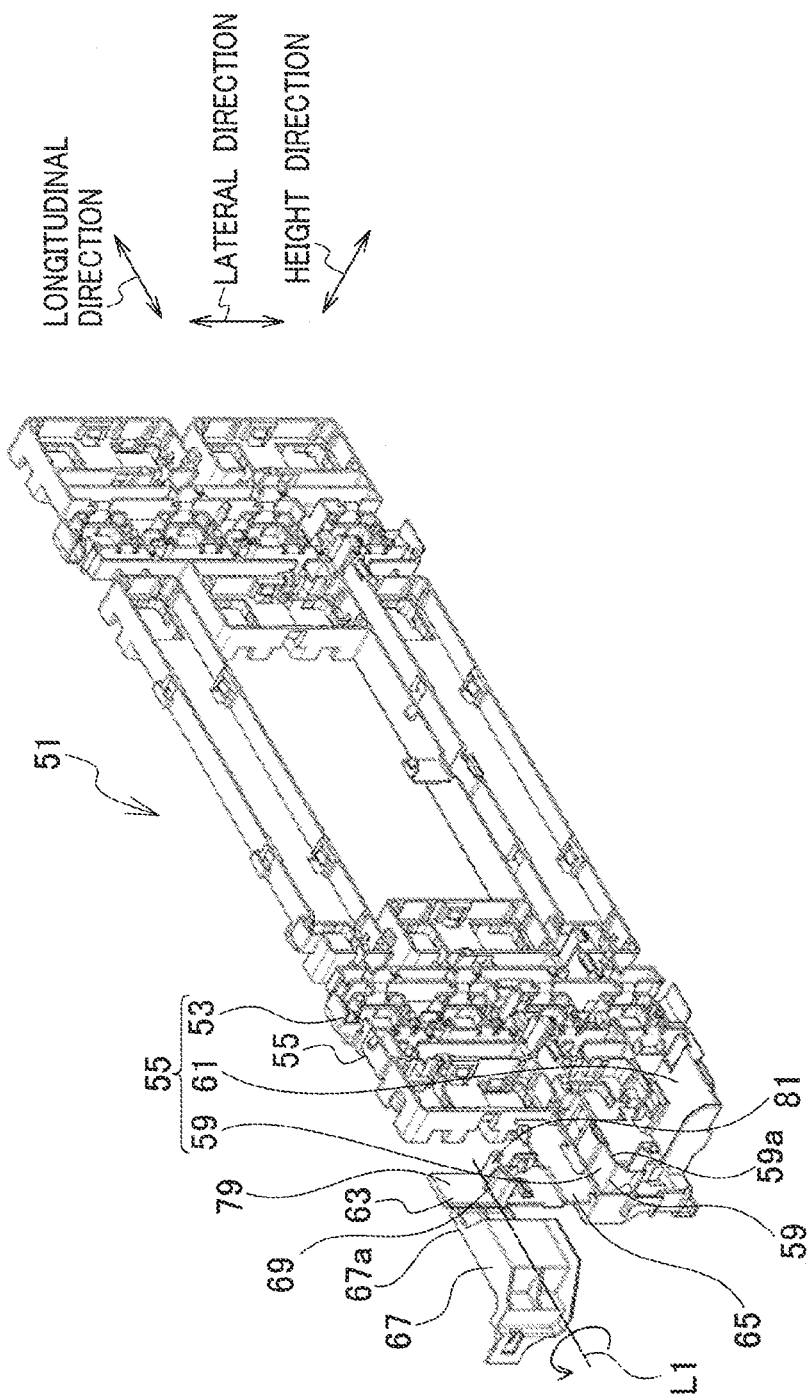
FIG. 14(a) is a perspective view showing a schematic configuration of the bus bar module according to the modified example of the embodiment of the present invention.
Figure 14B:
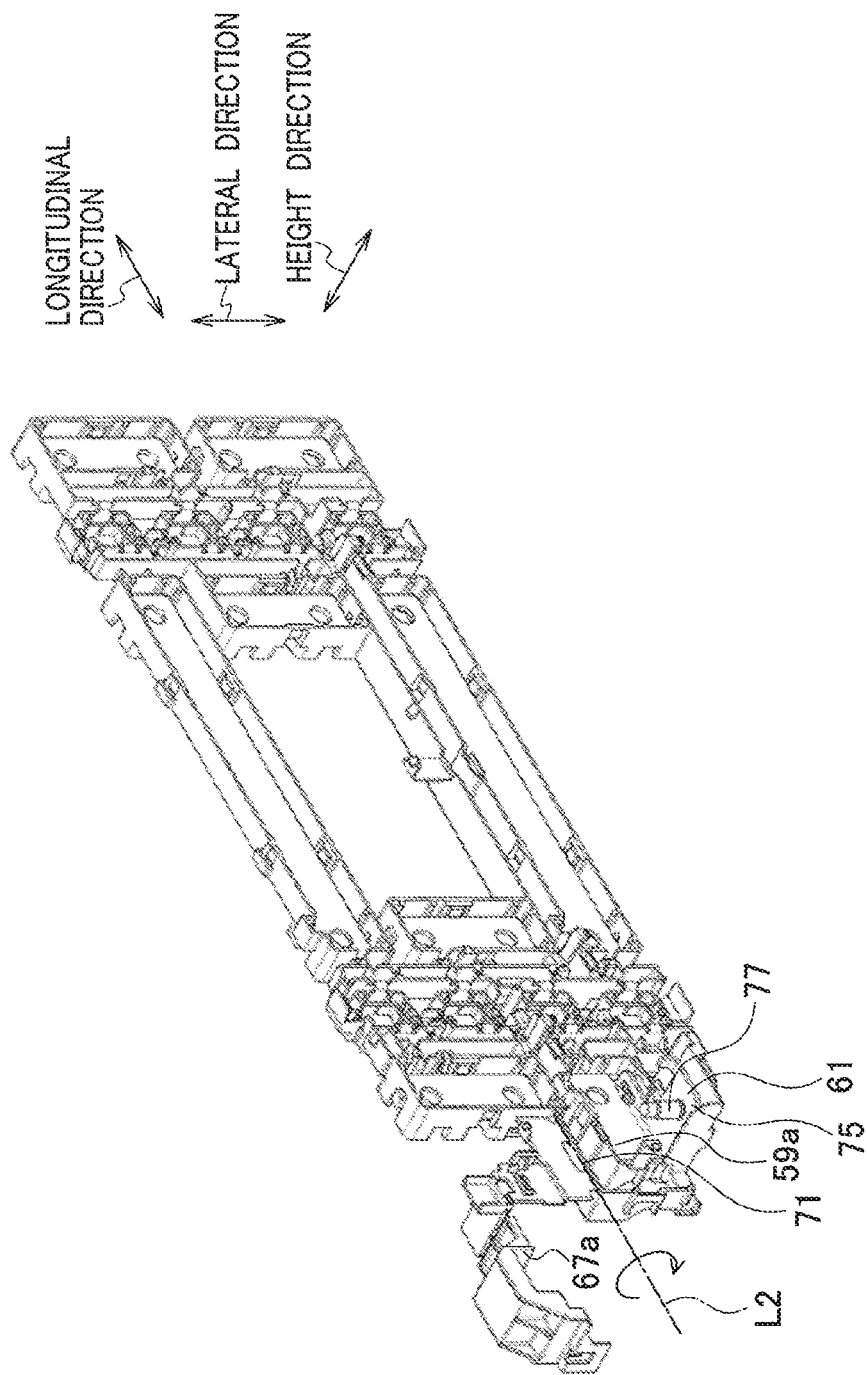
FIG. 14(b) is a perspective view showing the schematic configuration of the bus bar module according to the modified example of the embodiment of the present invention.

Locations of the first part 59, the second part 61, the first to third hinge covers 63, 65 and 67, and the first to third hinge parts 69, 71 and 73 with respect to the case 53 of the body part 55 may be arranged properly. For example, as shown in FIGS. 13(*a*) to 13(*c*) and 14(*a*) to 14(*c*), the battery connecting member 51 may have a configuration where the first part 59, the second part 61, the first to third hinge covers 63, 65 and 67, and the first to third hinge parts 69, 71 and 73 are arranged on the other end side in the longitudinal direction. Also the arrangement form (order of connections, etc.) of each hinge part, each hinge cover or bent state of each hinge part (bent angle, etc.) may be modified properly.

Incidentally, the battery connecting member 51 is an example of a bus bar module having one or more parts (parts which should be protected by putting a cover thereon necessarily or preferably) provided on a body part configured to have a metallic material and a case made of synthetic resin, the bus bar module having, through hinge parts whose number is greater than the number of the parts which should be protected (for example, by one), hinge covers whose number is greater than the number of the parts (for example, the same number as that of hinge parts) directly or indirectly connected to the case of the body part (for example, the hinge parts and the hinge covers are directly connected and protrude from the case of the body part), the hinge covers and the hinge parts made of synthetic resin as with the case and integrally formed with the case of the body part, and each of the hinge covers being bent at each of the hinge parts at a predetermined angle, so as to cover the parts which should be protected (when the number of the parts is two or more, each part is configured to be covered by each hinge cover).

Incidentally, the bus bar module has one extra hinge cover, which merely functions as a connecting part and does not necessarily cover the parts.

REFERENCE SIGNS LIST

51 bus bar module (battery connecting member)
55 body part
59 first part (wire guiding path)
61 second part (bus bar part with caulking bolt)
63 first hinge cover
65 second hinge cover
67 third hinge cover
69 first hinge part
71 second hinge part
73 third hinge part
L1 first bent line
L2 second bent line
L3 third bent line

The invention claimed is:

1. A bus bar module having a first part and a second part provided on a body part of the bus bar module configured to have a metallic material and a case made of synthetic resin, the bus bar module comprising:
   a first hinge cover connected through a first hinge part to the case of the body part;
   a second hinge cover connected through a second hinge part to the case of the body part; and
   a third hinge cover connected through a third hinge part to the case of the body part, wherein
   the first to third hinge covers and the first to third hinge parts are made of synthetic resin and integrally formed with the case of the body part,
   in a first state of the bus bar module, an undercut part does not exist in the case of the body part, the first to third hinge covers and the first to third hinge parts,
   the second hinge cover is oriented at the second hinge part at a predetermined angle so that at least a part of the second hinge cover covers the first part, and
   the first hinge cover is oriented at the first hinge part at a predetermined angle, and the third hinge cover is oriented at the third hinge part at a predetermined angle so that at least a part of the third hinge cover covers the second part,
   the second hinge cover is directly connected to the case of the body part through the second hinge part,
   the first hinge cover is directly connected to the second hinge cover through the first hinge part,
   the third hinge cover is directly connected to the first hinge cover through the third hinge part, and
   the body part, the second hinge part, the second hinge cover, the first hinge part, the first hinge cover, the third hinge part and the third hinge cover are connected in continuity in this order.

2. The bus bar module according to claim 1, wherein
   in the first state, a first straight bent line at the first hinge part and a second straight bent line at the second hinge part are parallel to each other, and a third straight bent line at the third hinge part and the first straight bent line at the first hinge part are perpendicular to each other.

* * * * *